(12) United States Patent
Swaminathan

(10) Patent No.: US 8,432,872 B2
(45) Date of Patent: Apr. 30, 2013

(54) CREATING PDN CONTEXT IN EHRPD NETWORK OVER A LTE TUNNEL

(75) Inventor: Arvind Swaminathan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 318 days.

(21) Appl. No.: 12/872,292

(22) Filed: Aug. 31, 2010

(65) Prior Publication Data

US 2012/0051328 A1    Mar. 1, 2012

(51) Int. Cl.
*H04W 4/00* (2009.01)

(52) U.S. Cl.
USPC ............................................ 370/332; 455/439

(58) Field of Classification Search .................. None
See application file for complete search history.

(56) References Cited

U.S. PATENT DOCUMENTS

| | | | |
|---|---|---|---|
| 2005/0078824 A1* | 4/2005 | Malinen et al. ............... | 380/247 |
| 2008/0259869 A1 | 10/2008 | Wang et al. | |
| 2009/0201878 A1 | 8/2009 | Kotecha et al. | |
| 2009/0303966 A1 | 12/2009 | Cherian et al. | |
| 2011/0170411 A1* | 7/2011 | Wang et al. ................... | 370/235 |
| 2011/0200010 A1* | 8/2011 | Hu et al. ....................... | 370/331 |

OTHER PUBLICATIONS

"3rd Generation Partnership Project: Technical Specification Group Radio Acess Network: Improved Network Controlled Mobility between E-UTRAN and 3GPP2/Mobile WiMAX Radio Technologies (Release 9 )", 3GPP Standard: 3GPP TR 36.938, 3rd Generation Partnership Project (3GPP), Mobile Competence Centre ; 650, Route Des Lucioles ; F-06921 Sophia-Antipolis CEDEX; France, No. V9.0. 0, Dec. 21, 2009, pp. 1-34, XP050401521, [retrieved on Dec. 21, 2009] pp. 10-14, paragraph 6.2.3.1-6.2.3.3 p. 31, paragraph 8.1.
International Search Report and Written Opinion—PCT/US2011/049445—ISA/EPO—Nov. 17, 2011.

* cited by examiner

*Primary Examiner* — Jianye Wu
(74) *Attorney, Agent, or Firm* — Kam T. Tam

(57) ABSTRACT

Pre-registration involves establishing and maintaining the same Packet Data Network (PDN)/Quality of Service (QoS) context that exists in a 3GPP Long Term Evolution (LTE) network via a data tunnel in a 3GPP2 evolved High Rate Packet Data (eHRPD) network. To avoid undue increases in the traffic on a LTE Air Interface and core network, optimizations selectively complete the PDN context only for a subset of the PDN connections, only when close to performing a handover, or other trigger conditions.

82 Claims, 14 Drawing Sheets

CREATING PDN CONTEXT IN EHRPD NETWORK OVER A LTE TUNNEL

BACKGROUND

1. Field

The present disclosure relates to a mobile operating environment, and more particularly, to maintaining data packet session continuity when changing coverage areas that use different radio access technologies.

2. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

Universal Mobile Telecommunications System (UMTS) is one of the third-generation (3G) cell phone technologies. UTRAN, short for UMTS Terrestrial Radio Access Network, is a collective term for the Node-B's and Radio Network Controllers which make up the UMTS radio access network. This communications network can carry many traffic types from real-time Circuit Switched to IP based Packet Switched. The UTRAN allows connectivity between the UE (user equipment) and the core network. The UTRAN contains the base stations, which are called Node Bs, and Radio Network Controllers (RNC). The RNC provides control functionalities for one or more Node Bs. A Node B and an RNC can be the same device, although typical implementations have a separate RNC located in a central office serving multiple Node B's. Despite the fact that they do not have to be physically separated, there is a logical interface between them known as the Iub. The RNC and its corresponding Node Bs are called the Radio Network Subsystem (RNS). There can be more than one RNS present in an UTRAN.

CDMA2000 (also known as IMT Multi Carrier (IMT MC)) is a family of 3G mobile technology standards, which use CDMA channel access, to send voice, data, and signaling data between mobile phones and cell sites. The set of standards includes: CDMA2000 1×, CDMA2000 EV-DO Rev. 0, CDMA2000 EV-DO Rev. A, and CDMA2000 EV-DO Rev. B. All are approved radio interfaces for the ITU's IMT-2000. CDMA2000 has a relatively long technical history and is backward-compatible with its previous 2G iteration IS-95 (cdmaOne).

CDMA2000 1× (IS-2000), also known as 1× and 1×RTT, is the core CDMA2000 wireless air interface standard. The designation "1×", meaning 1 times Radio Transmission Technology, indicates the same RF bandwidth as IS-95: a duplex pair of 1.25 MHz radio channels. 1×RTT almost doubles the capacity of IS-95 by adding 64 more traffic channels to the forward link, orthogonal to (in quadrature with) the original set of 64. The 1× standard supports packet data speeds of up to 153 kbps with real world data transmission averaging 60-100 kbps in most commercial applications. IMT-2000 also made changes to the data link layer for the greater use of data services, including medium and link access control protocols and Quality of Service (QoS). The IS-95 data link layer only provided "best effort delivery" for data and circuit switched channel for voice (i.e., a voice frame once every 20 ms).

CDMA2000 1× EV-DO (Evolution-Data Optimized), often abbreviated as EV-DO or EV, is a telecommunications standard for the wireless transmission of data through radio signals, typically for broadband Internet access. It uses multiplexing techniques including code division multiple access (CDMA) as well as time division multiple access (TDMA) to maximize both individual user's throughput and the overall system throughput. It is standardized by 3rd Generation Partnership Project 2 (3GPP2) as part of the CDMA2000 family of standards and has been adopted by many mobile phone service providers around the world, particularly those previously employing CDMA networks.

3GPP LTE (Long Term Evolution) is the name given to a project within the 3rd Generation Partnership Project (3GPP) to improve the UMTS mobile phone standard to cope with future requirements. Goals include improving efficiency, lowering costs, improving services, making use of new spectrum opportunities, and better integration with other open standards. The LTE system is described in the Evolved UTRA (EUTRA) and Evolved UTRAN (EUTRAN) series of specifications.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In one aspect, a method is provided for maintaining session continuity in a packet data network. Packet data is communicated with a first radio access network using a first radio access technology. A trigger is determined exists for selectively pre-registering a packet data context. The packet data context is pre-registered with a second radio access network that uses a second radio access technology via a data tunnel established by the first radio access network.

In another aspect, at least one processor is provided for maintaining session continuity in a packet data network. A first module communicates packet data with a first radio access network using a first radio access technology. A second module determines a trigger exists for selectively pre-registering packet data context. A third module pre-registers the packet data context with a second radio access network that uses a second radio access technology via a data tunnel established by the first radio access network.

In an additional aspect, a computer program product is provided for maintaining session continuity in a packet data network. A non-transitory computer-readable storage medium comprises sets of codes. A first set of codes causes a computer to communicate packet data with a first radio access network using a first radio access technology. A second set of codes causes the computer to determine a trigger exists for selectively pre-registering packet data context. A third set of codes causes the computer to pre-register the packet data context with a second radio access network that uses a second radio access technology via a data tunnel established by the first radio access network.

In another additional aspect, an apparatus is provided for maintaining session continuity in a packet data network. Means are provided for communicating packet data with a first radio access network using a first radio access technology. Means are provided for determining a trigger exists for selectively pre-registering packet data context. Means are provided for pre-registering the packet data context with a second radio access network that uses a second radio access technology via a data tunnel established by the first radio access network.

In a further aspect, an apparatus is provided for maintaining session continuity in a packet data network. A transceiver communicates packet data with a first radio access network using a first radio access technology. A computing platform determines a trigger exists for selectively pre-registering the packet data context. The transceiver further pre-registers packet data context with a second radio access network that uses a second radio access technology via a data tunnel established by the first radio access network.

In yet another aspect, a method is provided for maintaining session continuity in a packet data network. Packet data is communication with user equipment from a first radio access network using a first radio access technology. A trigger is determined to exist for selectively pre-registering a packet data context. The packet data context is pre-registered by facilitating a data tunnel with a second radio access network that uses a second radio access technology.

In yet an additional aspect, at least one processor is provided for maintaining session continuity in a packet data network. A first module communicates packet data with user equipment from a first radio access network using a first radio access technology. A second module determines a trigger exists for selectively pre-registering a packet data context. A third module pre-registers the packet data context by facilitating a data tunnel with a second radio access network that uses a second radio access technology.

In yet another additional aspect, a computer program product is provided for maintaining session continuity in a packet data network. A non-transitory computer-readable storage medium comprises sets of codes. A first set of codes causes a computer to communicate packet data with user equipment from a first radio access network using a first radio access technology. A second set of codes causes the computer to determine a trigger exists for selectively pre-registering a packet data context. A third set of codes causes the computer to pre-register the packet data context by facilitating a data tunnel with a second radio access network that uses a second radio access technology.

In yet a further aspect, an apparatus is provided for maintaining session continuity in a packet data network. Means are provided for communicating packet data with user equipment from a first radio access network using a first radio access technology. Means are provided for determining a trigger exists for selectively pre-registering a packet data context. Means are provided for pre-registering the packet data context by facilitating a data tunnel with a second radio access network that uses a second radio access technology.

In another aspect, an apparatus is provided for maintaining session continuity in a packet data network. A transceiver communicates packet data with user equipment from a first radio access network using a first radio access technology. A computing platform determines a trigger exists for selectively pre-registering a packet data context. A network interface pre-registers the packet data context by facilitating a data tunnel with a second radio access network that uses a second radio access technology.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Many 3GPP2 operators are deploying 3GPP Long Term Evolution (LTE) moving forward. Initial deployment is expected to have islands of LTE coverage with more universal evolved High Rate Packet Data (eHRPD) coverage. Hence, a mobile User Equipment (UE) camped on LTE could run out of LTE coverage and be forced to move to eHRPD for continuing its service. In order to provide a good user experience there needs to be minimal service discontinuity while moving from LTE to eHRPD. Since creating Data Only (DO) session, Point-to-Point Protocol (PPP) context and Quality of Service (QoS) context after moving to eHRPD can take several tens of seconds, a procedure is closed to avoid a noticeable gap before service can be resumed on eHRPD. In particular, the UE selectively pre-registers on eHRPD while still camped on LTE. Pre-registration can involve establishing and maintaining the same Packet Data Network (PDN)/QoS context that exists in the LTE network in the eHRPD network. To avoid an undue increase in the traffic on the LTE air interface and the core network, optimizations are provided that can be used to select the PDN context that needs to be pre-established in eHRPD and thus reduce the traffic load.

Figure 1:
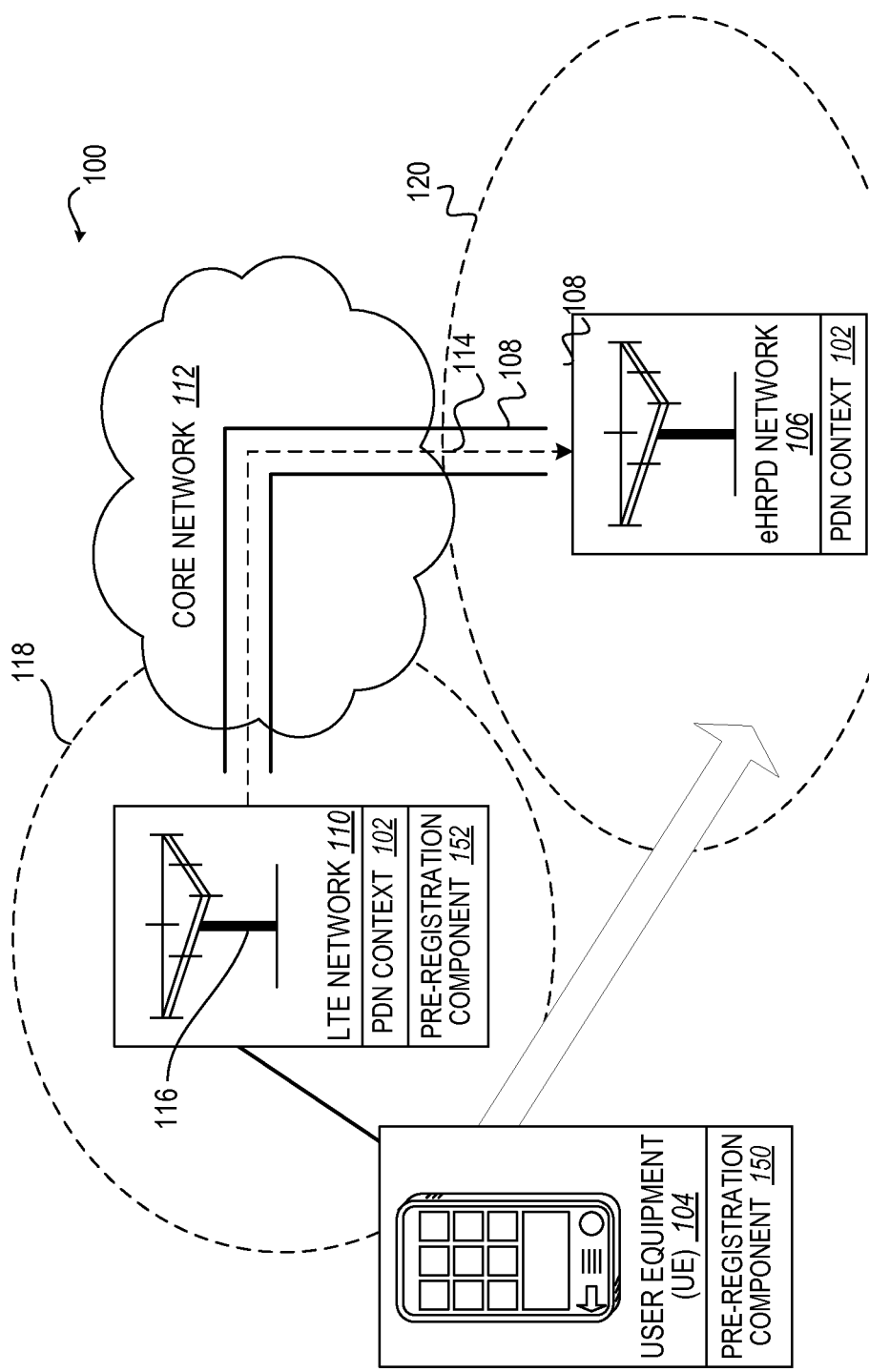
FIG. 1 illustrates a schematic diagram of a wireless communication system that supports packet data network optimizations.

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects With initial reference to FIG. 1, a wireless communication system 100 supports optimizations by creating Packet Data Network (PDN) context 102 for User Equipment (UE) 104 in an evolved High Rate Packet Data (eHRPD) network 106 over a data tunnel 108 facilitated by a servicing Long Term Evolution (LTE) network 110 via a core network 112. Selective pre-registration 114 shortens the time significantly for registration when performing a hand-off but without an overhead burden of necessarily fully registering.

Many 3GPP2 operators are increasingly deploying LTE, depicted as an evolved Base node (eNB) 116. Initial deployment is expected to have islands of LTE coverage 118 within more universally available eHRPD coverage 120. Hence, a mobile UE 104 camped on LTE coverage 118 could run out of LTE coverage 118 and be forced to move to eHRPD coverage 120 for continuing its service.

In order to provide good user experience there needs to be minimal service discontinuity while moving from LTE coverage 118 to eHRPD coverage 120. Creating (Data Optimized) DO session, Point-to-Point Protocol (PPP) context and Quality of Service (QoS) context after moving to eHRPD can take several tens of seconds. The present innovation provides a procedure to avoid what would otherwise be a noticeable gap before service can be resumed on eHRPD coverage 120. In particular, UE pre-registering on eHRPD network 106 while camped on the LTE network 110 is described herein. In one aspect, pre-registering is done selectively or incompletely in order to avoid unnecessarily burdening the system 100.

The UE 104 and eNB 116 can respectively incorporate a pre-registration component 150, 152 for performing the afore-mentioned selective pre-registration with the eHRPD network 106.

Figure 2:
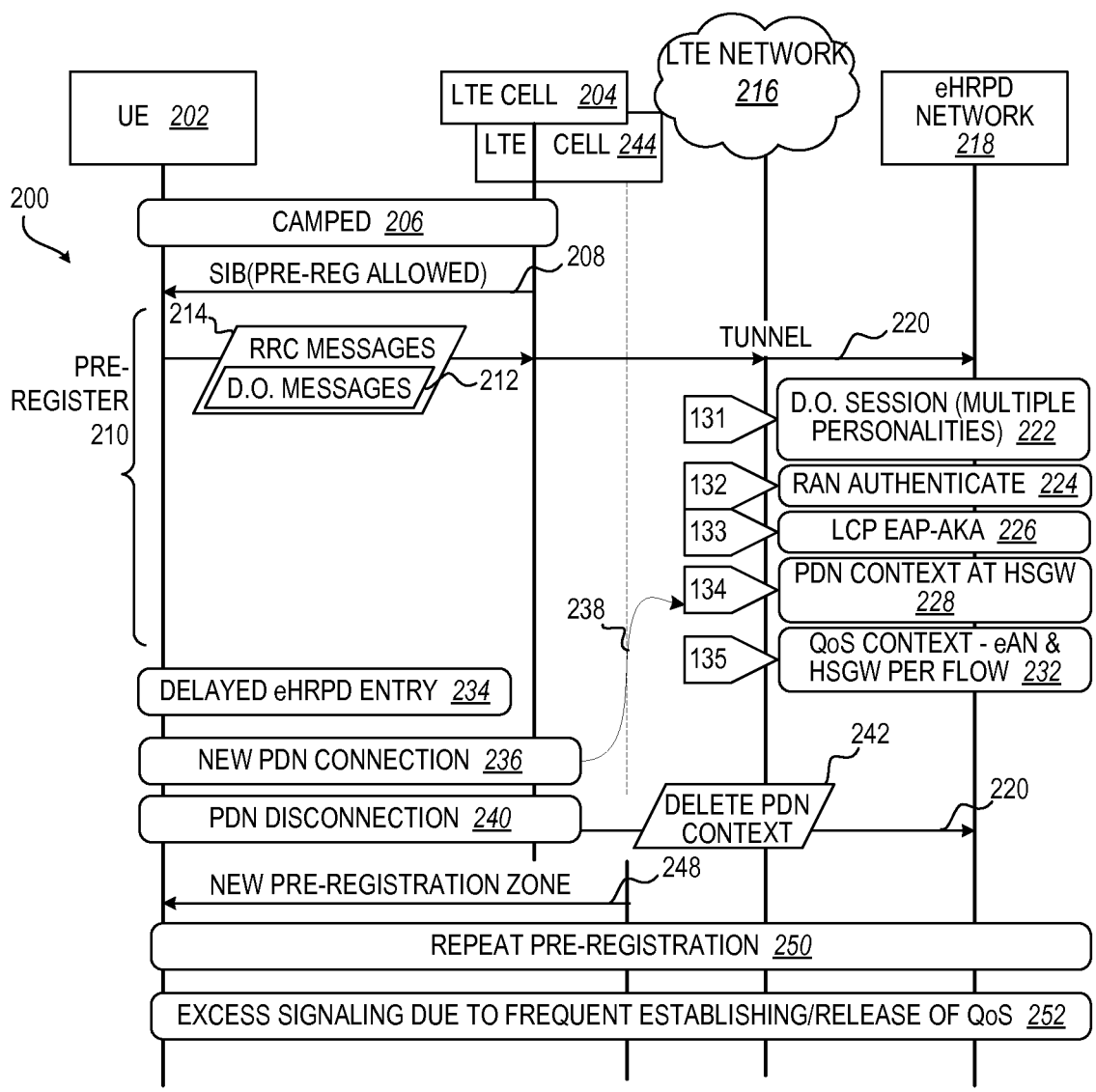
FIG. 2 illustrates a timing diagram for pre-registration and registration to optimize transitioning from LTE to eHRPD coverage.

In FIG. 2, a timing diagram 200 depicts an exemplary methodology for pre-registration and registration to optimize transitioning from LTE to eHRPD coverage. Initially, UE 202 is camped on LTE cell 204 (block 206). LTE cell 204 broadcasts a System Information Block (SIB) with the "Pre-Registration Allowed" flag set, as depicted at 208. UE 202 performs a pre-registration procedure while camped on LTE cell 204, depicted at 210. During the pre-registration procedure, the UE 202 sends DO messages 212 within LTE Radio Resource Control (RRC) messages 214 to the LTE cell 204. An LTE network 216 transports the DO messages 212 to an eHRPD network 218 through a tunnel 220.

The DO messages 212 sent by the UE 202 are used by the eHRPD network 218:

(1) To create a DO session with multiple personalities (block 222);

(2) To perform Radio Access Network (RAN)-level authentication (block 224);

(3) For Link Control Protocol (LCP) negotiation and Extensible Authentication Protocol (EAP)—Authentication and Key Agreement (AKA) authentication (block 226). LCP is used to automatically agree upon encapsulation format options, handle varying packet size limits, authenticate the identity of its peer on the link, determine when a link is functioning properly and when it is defunct, detect a looped-back link and other common misconfiguration errors, and terminate the link.

(4) Establish PDN context at HRPD Serving Gateway (HSGW) for each PDN connection that currently exists in LTE (block 228).

(5) Establish QoS context at an evolved Access Node (eAN) and the HSGW for each QoS flow that currently exists in LTE (block 232).

However, maintaining the exact PDN/QoS context state in the eHRPD network 218 as that exists in LTE can lead to a lot of traffic over the LTE air-interface and the LTE-eHRPD tunnel due to the following reasons.

(1) The delay between the time the UE 202 completes the initial pre-registration and the time the UE 202 moves into the eHRPD network 218 can be large (block 234). For instance, the UE 202 is stationary/slow-moving or the UE 202 is moving deeper into LTE coverage 204.

(2) In this time, for each new PDN connection that is created (block 236), the UE 202 has to perform steps 4 (block 228) and 5 (block 232) as depicted at 238.

(3) When an existing PDN connection is disconnected during this time (block 240), the UE 202 also has to delete PDN context and QoS context in the HSGW 226 over the LTE tunnel 220 (block 242). This is especially inefficient for certain short-lived services provided by operators (e.g., push e-mail). In these cases, the PDN connection is brought up for a brief amount of time and then disconnected.

(4) If the UE 202 moves into a second LTE cell 244 that advertises a new pre-registration zone as depicted at 246, the UE 202 might have to repeat all the steps again, as depicted at 248.

(5) The UE can have up to 11 PDN connections while camped on LTE (block 250).

(6) If PDN connections have QoS flows that are established and released frequently, keeping the eHRPD pre-registration context up to date will lead to a lot of signaling (block 252).

Consequently, pre-registration involves establishing/maintaining the same PDN/QoS context that exists in the LTE network 216 in the eHRPD network 218 can increase the traffic on a LTE Air Interface (AI) and the core network. Thus, in this innovation, optimizations are disclosed that can be used to select the PDN context that needs to be pre-established in the eHRPD network 218 and thus reduce the traffic load.

Figure 3:
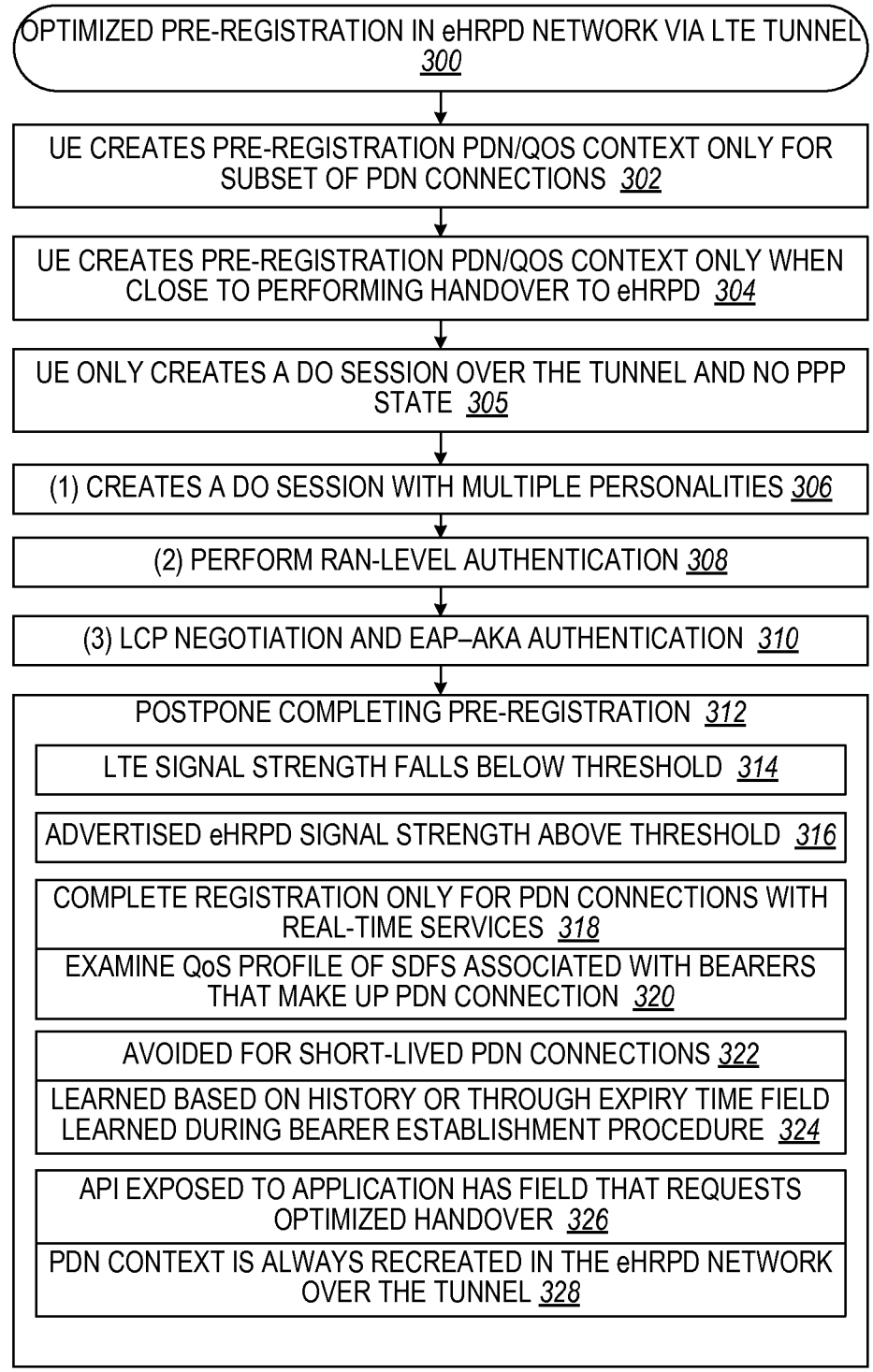
FIG. 3 illustrates a flow diagram for a methodology for optimized pre-registration in an eHRPD network. via an LTE tunnel.

To that end, in FIG. 3, a methodology 300 is depicted for optimized pre-registration in an eHRPD network via an LTE tunnel. In one aspect, such optimizations provide that a UE creates the pre-registration PDN/QoS context only for a subset of the PDN connections (block 302). Alternatively or in addition, the UE creates the pre-registration PDN/QoS context only when close to performing a handover to eHRPD (block 304). As yet another aspect, the UE only creates a DO session over the tunnel and no PPP state (block 305). The following conditions that can be used by the UE to decide if a given PDN context established on LTE has to be recreated in the eHRPD network over the tunnel.

First, the UE can complete steps 1-3 of the pre-registration procedure specified earlier when asked to pre-register. In particular, (1) creates a DO session with multiple personalities (block 306); (2) perform RAN-level authentication (block 308); and (3) LCP negotiation and EAP-AKA Authentication (block 310). However, completing pre-registration can be postponed until deemed necessary (i.e., steps 4 and 5)

(block 312). For instance, the LTE signal strength falls below a certain threshold (block 314). For another instance, if the LTE network is advertising eHRPD neighbors, the UE can execute steps 4 and 5 when the signal strength of an eHRPD neighbor falls above a certain threshold (block 316).

In a second aspect, alternatively or in addition, completing registration (i.e., steps 4 and 5) can be performed only for PDN connections with real-time services (block 318). The UE can determine which PDN connections have real-time flows by examining the QoS profile of the Service Data Flows (SDFs) associated with bearers that make up the PDN connection (block 320).

In a third aspect, alternatively or in addition, completing pre-registration (i.e., steps 4 and 5) are avoided for short-lived PDN connections (block 322). This can be learned by the UE based on previous history or through an expiry time field learned during the bearer establishment procedure (block 324).

In a fourth aspect, alternatively or in addition, an Application Program Interface (API) exposed to an application can be modified to include a field used by the application to request optimized handover (block 326). If the field is set, the PDN context is always recreated in the eHRPD network over the tunnel (block 328).

Figure 4:
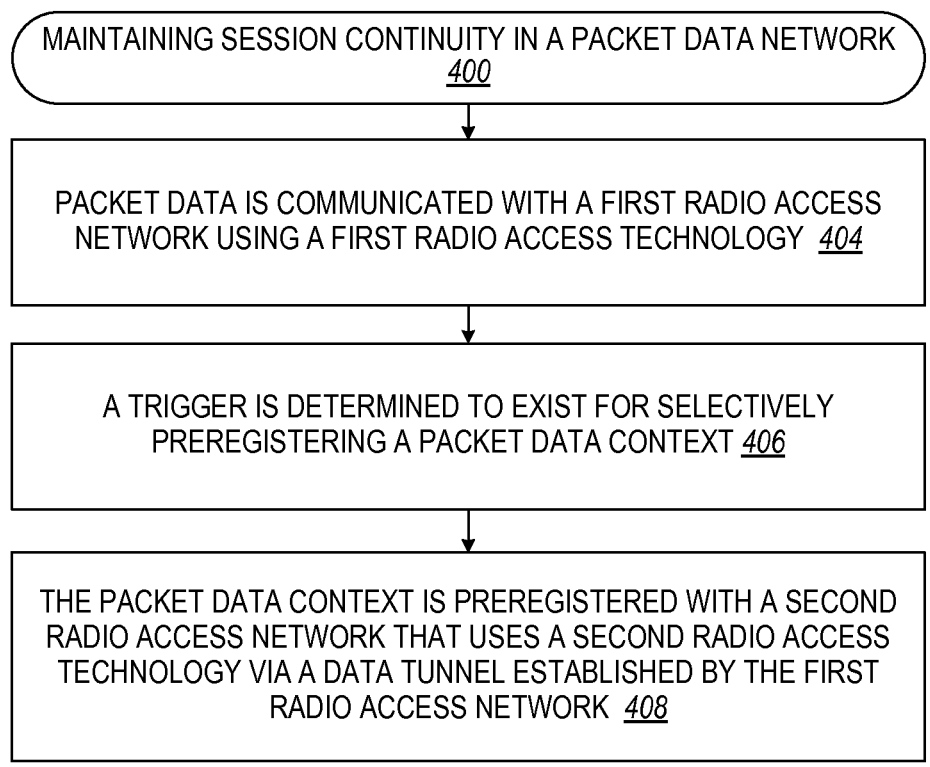
FIG. 4 illustrates a flow diagram for a methodology for maintaining session continuity in a packet data network.

In FIG. 4, a methodology or sequence of operations 400 is depicted for maintaining session continuity in a packet data network. Packet data is communicated with a first radio access network using a first radio access technology (block 404). A trigger is determined to exist for selectively pre-registering a packet data context (block 406). The packet data context is pre-registered with a second radio access network that uses a second radio access technology via a data tunnel established by the first radio access network (block 408).

Figure 5:
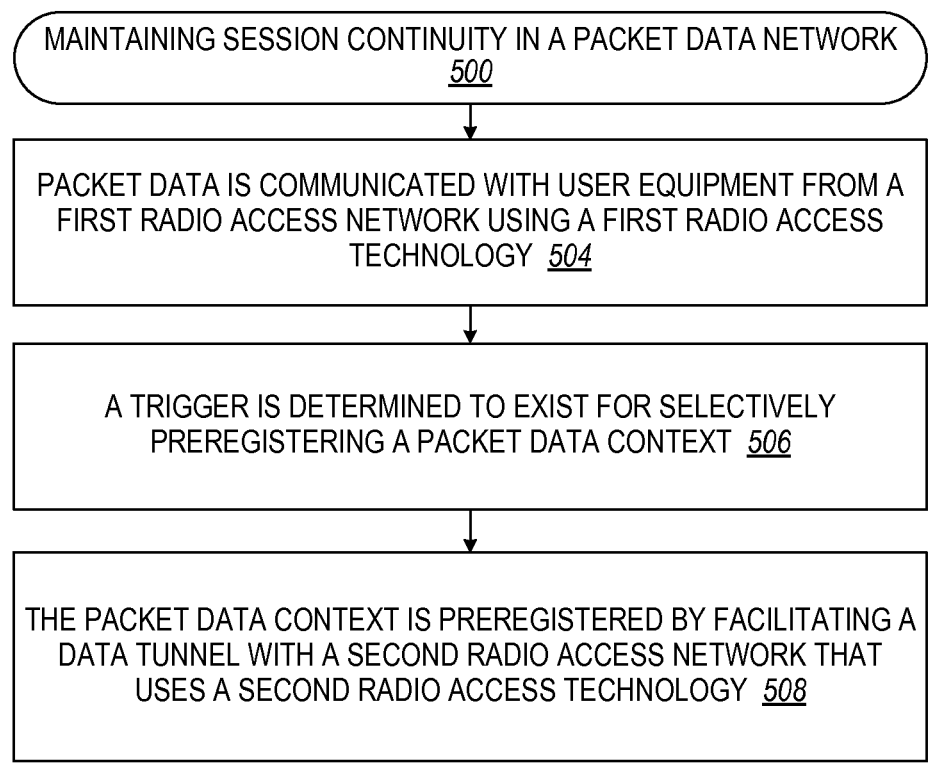
FIG. 5 illustrates a flow diagram for a methodology for maintaining session continuity in a packet data network.

In FIG. 5, a methodology or sequence of operations 500 is depicted for maintaining session continuity in a packet data network. Packet data is communicated with user equipment from a first radio access network using a first radio access technology (block 504). A trigger is determined to exist for selectively pre-registering a packet data context (block 506). The packet data context is pre-registered by facilitating a data tunnel with a second radio access network that uses a second radio access technology (block 508).

Figure 6:
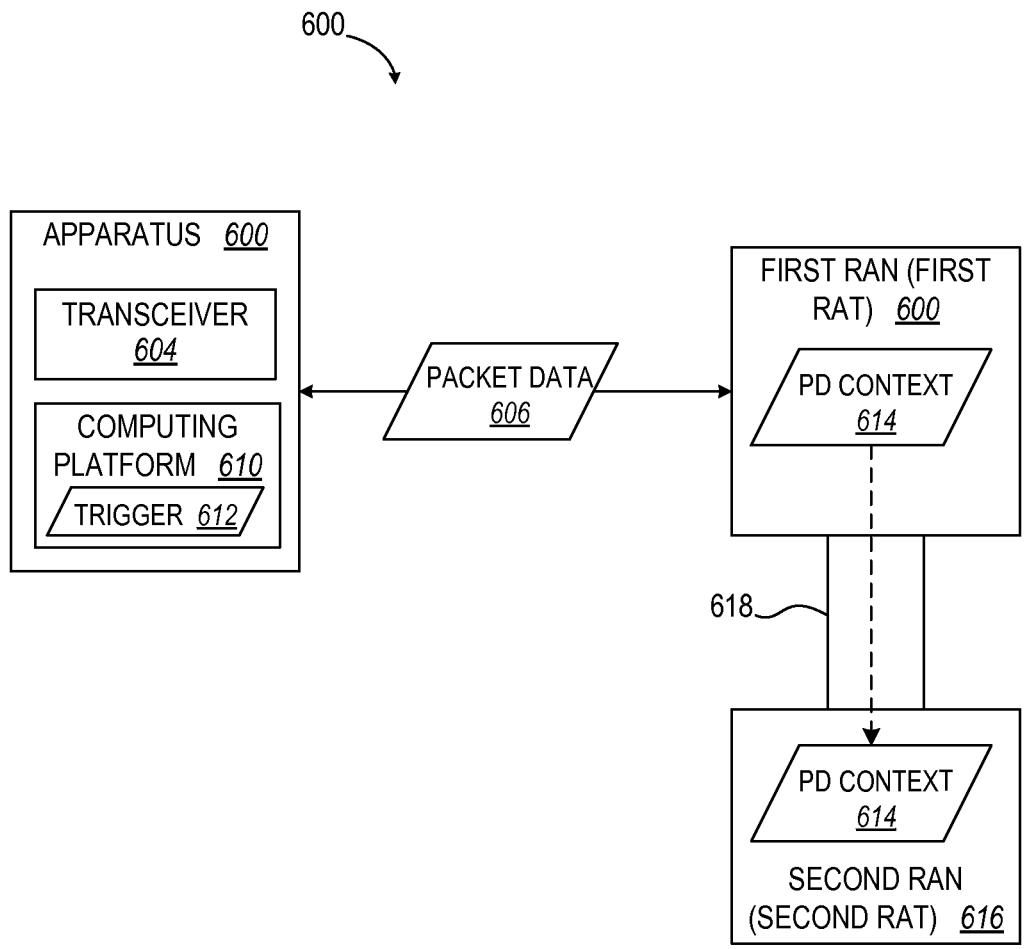
FIG. 6 illustrates a schematic diagram of an apparatus for maintaining session continuity in a packet data network.

In FIG. 6, an apparatus 600 is depicted for maintaining session continuity in a packet data network 602. A transceiver 604 communicates packet data 606 with a first radio access network 608 using a first radio access technology. A computing platform 610 determines that a trigger 612 exists for selectively pre-registering packet data context 614. The transceiver 604 further pre-registers the packet data context 614 with a second radio access network 616 that uses a second radio access technology via a data tunnel 618 established by the first radio access network.

Figure 7:
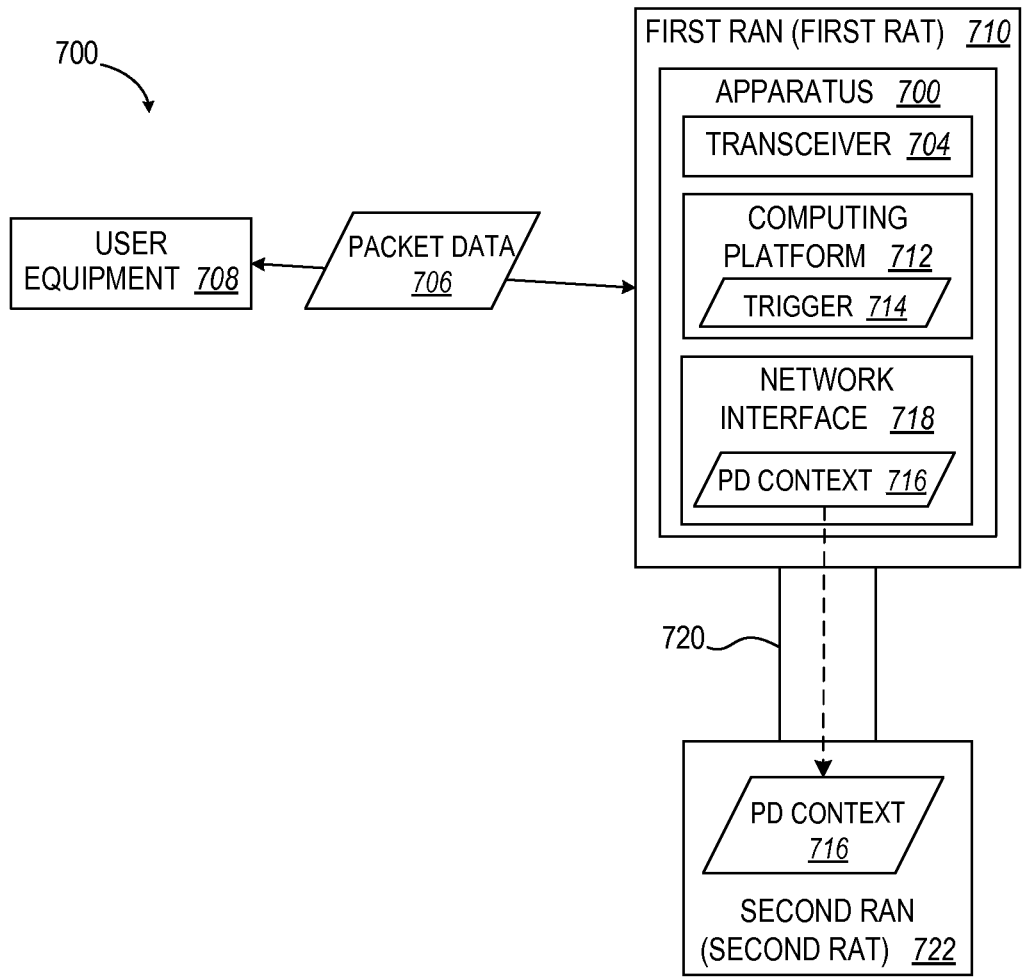
FIG. 7 illustrates a schematic diagram of an apparatus for maintaining session continuity in a packet data network.

In FIG. 7, an apparatus 700 is depicted for maintaining session continuity in a packet data network 702. A transceiver 704 communicates packet data 706 with user equipment 708 from a first radio access network 710 using a first radio access technology. A computing platform 712 determines that a trigger 714 exists for selectively pre-registering a packet data context 716. A network interface 718 pre-registers the packet data context 716 by facilitating a data tunnel 720 with a second radio access network 722 that uses a second radio access technology.

Figure 8:
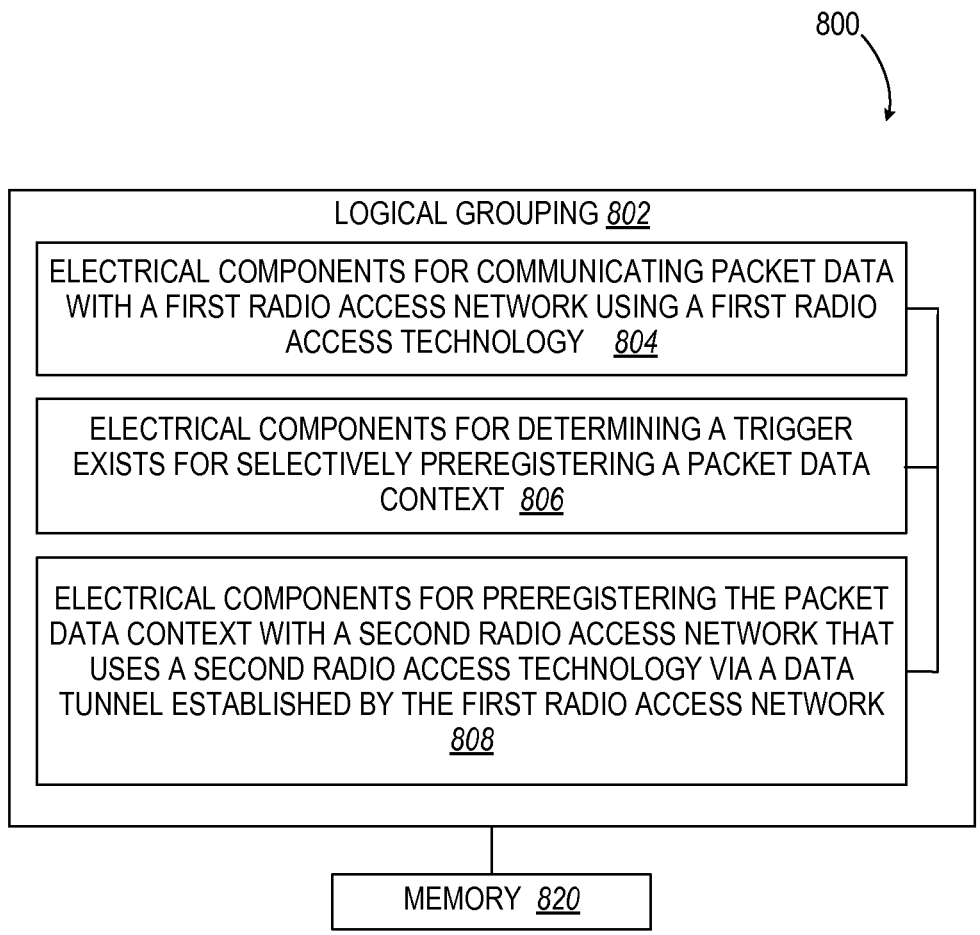
FIG. 8 illustrates a schematic diagram of a system for maintaining session continuity in a packet data network.

With reference to FIG. 8, illustrated is a system 800 for maintaining session continuity in a packet data network. For example, system 800 can reside at least partially within user equipment (UE). It is to be appreciated that system 800 is represented as including functional blocks, which can be functional blocks that represent functions implemented by a computing platform, processor, software, or combination thereof (e.g., firmware). System 800 includes a logical grouping 802 of electrical components that can act in conjunction. For instance, logical grouping 802 can include an electrical component for communicating packet data with a first radio access network using a first radio access technology 804. Moreover, logical grouping 802 can include an electrical component for determining a trigger exists for selectively pre-registering a packet data context 806. For another instance, logical grouping 802 can include an electrical component for pre-registering the packet data context with a second radio access network that uses a second radio access technology via a data tunnel established by the first radio access network 808. Additionally, system 800 can include a memory 820 that retains instructions for executing functions associated with electrical components 804-808. While shown as being external to memory 820, it is to be understood that one or more of electrical components 804-808 can exist within memory 820.

Figure 9:
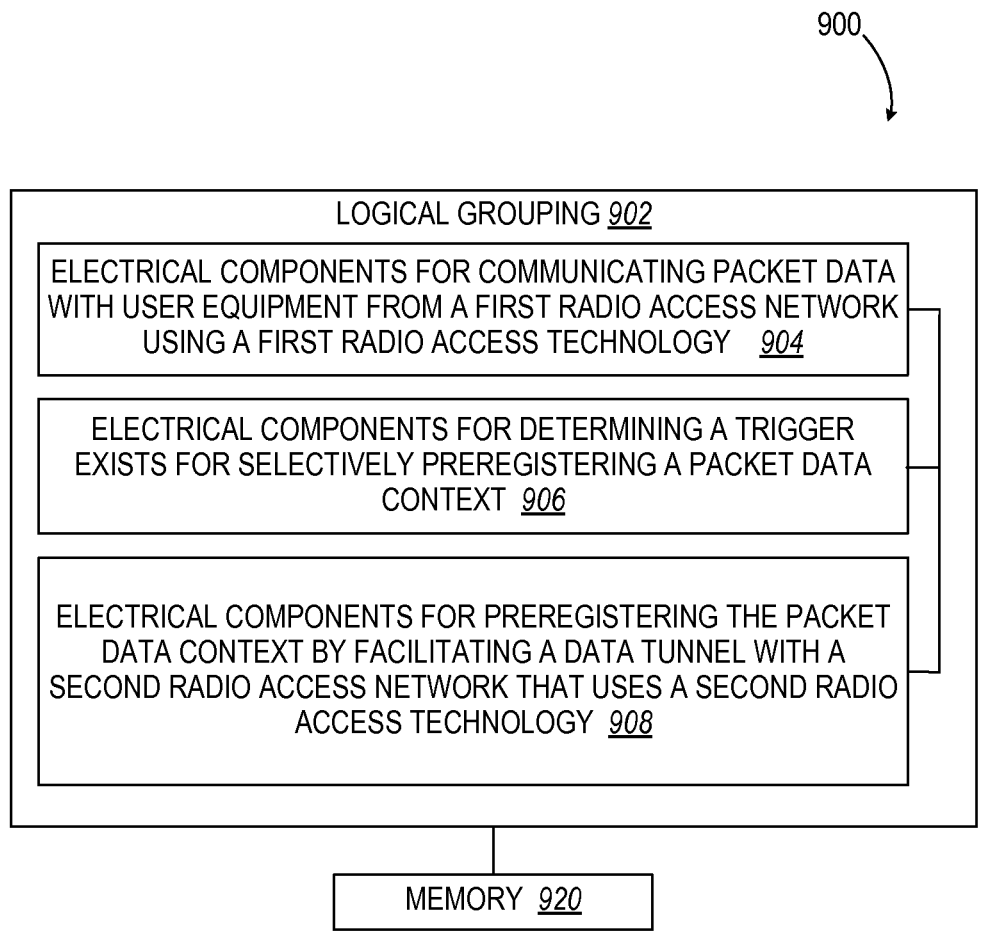
FIG. 9 illustrates a schematic diagram of a system for maintaining session continuity in a packet data network.

With reference to FIG. 9, illustrated is a system 900 for maintaining session continuity in a packet data network. For example, system 900 can reside at least partially within a network entity. It is to be appreciated that system 900 is represented as including functional blocks, which can be functional blocks that represent functions implemented by a computing platform, processor, software, or combination thereof (e.g., firmware). System 900 includes a logical grouping 902 of electrical components that can act in conjunction. For instance, logical grouping 902 can include an electrical component for communicating packet data with user equipment from a first radio access network using a first radio access technology 904. Moreover, logical grouping 902 can include an electrical component for determining a trigger exists for selectively pre-registering a packet data context 906. For another instance, logical grouping 902 can include an electrical component for pre-registering the packet data context by facilitating a data tunnel with a second radio access network that uses a second radio access technology 908. Additionally, system 900 can include a memory 920 that retains instructions for executing functions associated with electrical components 904-908. While shown as being external to memory 920, it is to be understood that one or more of electrical components 904-908 can exist within memory 920.

Figure 10:
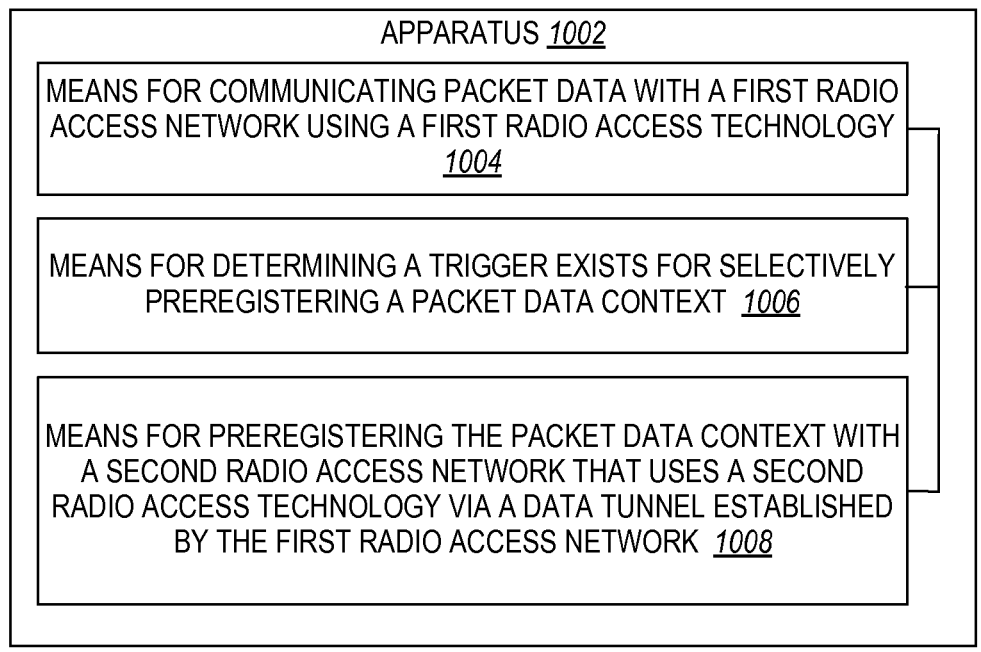
FIG. 10 illustrates a schematic diagram of an apparatus having means for maintaining session continuity in a packet data network.

In FIG. 10, an apparatus 1002 is depicted for maintaining session continuity in a packet data network. Means 1004 are provided for communicating packet data with a first radio access network using a first radio access technology. Means 1006 are provided for determining a trigger exists for selectively pre-registering a packet data context. Means 1008 are provided for pre-registering the packet data context with a second radio access network that uses a second radio access technology via a data tunnel established by the first radio access network.

Figure 11:
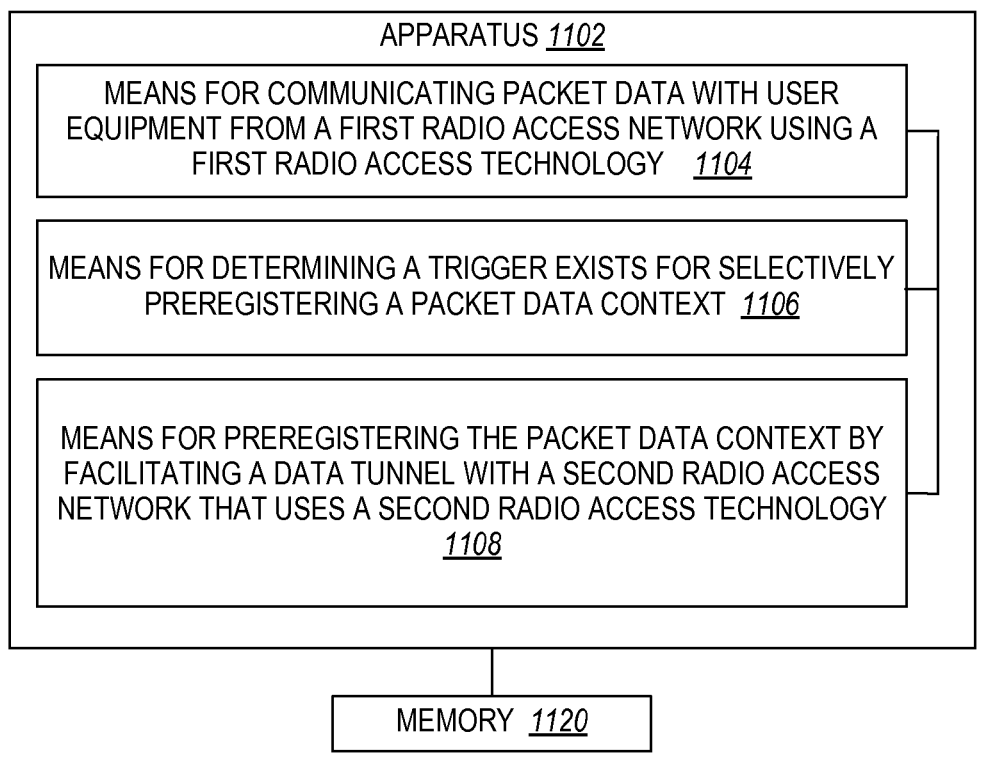
FIG. 11 illustrates a schematic diagram of an apparatus having means for maintaining session continuity in a packet data network.

In FIG. 11, an apparatus 1102 is depicted for maintaining session continuity in a packet data network. Means 1104 are provided for communicating packet data with user equipment from a first radio access network using a first radio access technology. Means 1106 are provided for determining a trigger exists for selectively pre-registering a packet data context. Means 1108 are provided for pre-registering the packet data context by facilitating a data tunnel with a second radio access network that uses a second radio access technology.

It should be appreciated that wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP LTE systems, and orthogonal frequency division multiple access (OFDMA) systems.

A wireless multiple-access communication system may simultaneously support communication for multiple wireless access terminals. As mentioned above, each terminal may communicate with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out system, a multiple-in-multiple-out ("MIMO") system, or some other type of system.

Figure 12:
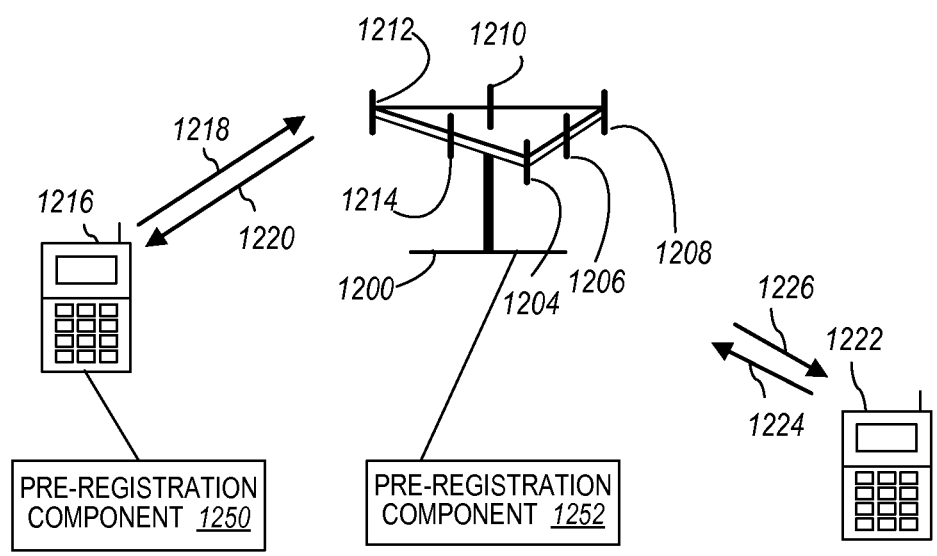
FIG. 12 illustrates a schematic diagram of a multiple access wireless communication system.

Referring to FIG. 12, a multiple access wireless communication system according to one aspect is illustrated. An access point (AP) 1200 includes multiple antenna groups, one including 1204 and 1206, another including 1208 and 1210, and an additional including 1212 and 1214. In FIG. 12, only two antennas are shown for each antenna group, however, more or fewer antennas may be utilized for each antenna group. Access terminal (AT) 1216 is in communication with antennas 1212 and 1214, where antennas 1212 and 1214 transmit information to access terminal 1216 over forward link 1220 and receive information from access terminal 1216 over reverse link 1218. Access terminal 1222 is in communication with antennas 1206 and 1208, where antennas 1206 and 1208 transmit information to access terminal 1222 over forward link 1226 and receive information from access terminal 1222 over reverse link 1224. In a Frequency Division Duplex (FDD) system, communication links 1218, 1220, 1224 and 1226 may use different frequencies for communication. For example, forward link 1220 may use a different frequency then that used by reverse link 1218.

Each group of antennas and/or the area in which they are designed to communicate is often referred to as a sector of the access point 400. In the aspect, antenna groups each are designed to communicate to access terminals 1216 and 1222 in a sector of the areas covered by access point 1200.

In communication over forward links 1220 and 1226, the transmitting antennas of access point 1200 utilize beamforming in order to improve the signal-to-noise ratio of forward links for the different access terminals 1216 and 1222. Also, an access point using beamforming to transmit to access terminals scattered randomly through its coverage causes less interference to access terminals in neighboring cells than an access point transmitting through a single antenna to all of its access terminals.

An access point 400 may be a fixed station used for communicating with the terminals and may also be referred to as an access point, a Node B, or some other terminology. An access terminal 1216 and 1222 may also be called user equipment (UE), a wireless communication device, terminal, or some other terminology.

The access terminal 1216 and access point 1200 can respectively incorporate a pre-registration component 1250, 1252 for performing the afore-mentioned selective pre-registration with an eHRPD network (not shown).

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex ("TDD") and frequency division duplex ("FDD"). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 13:
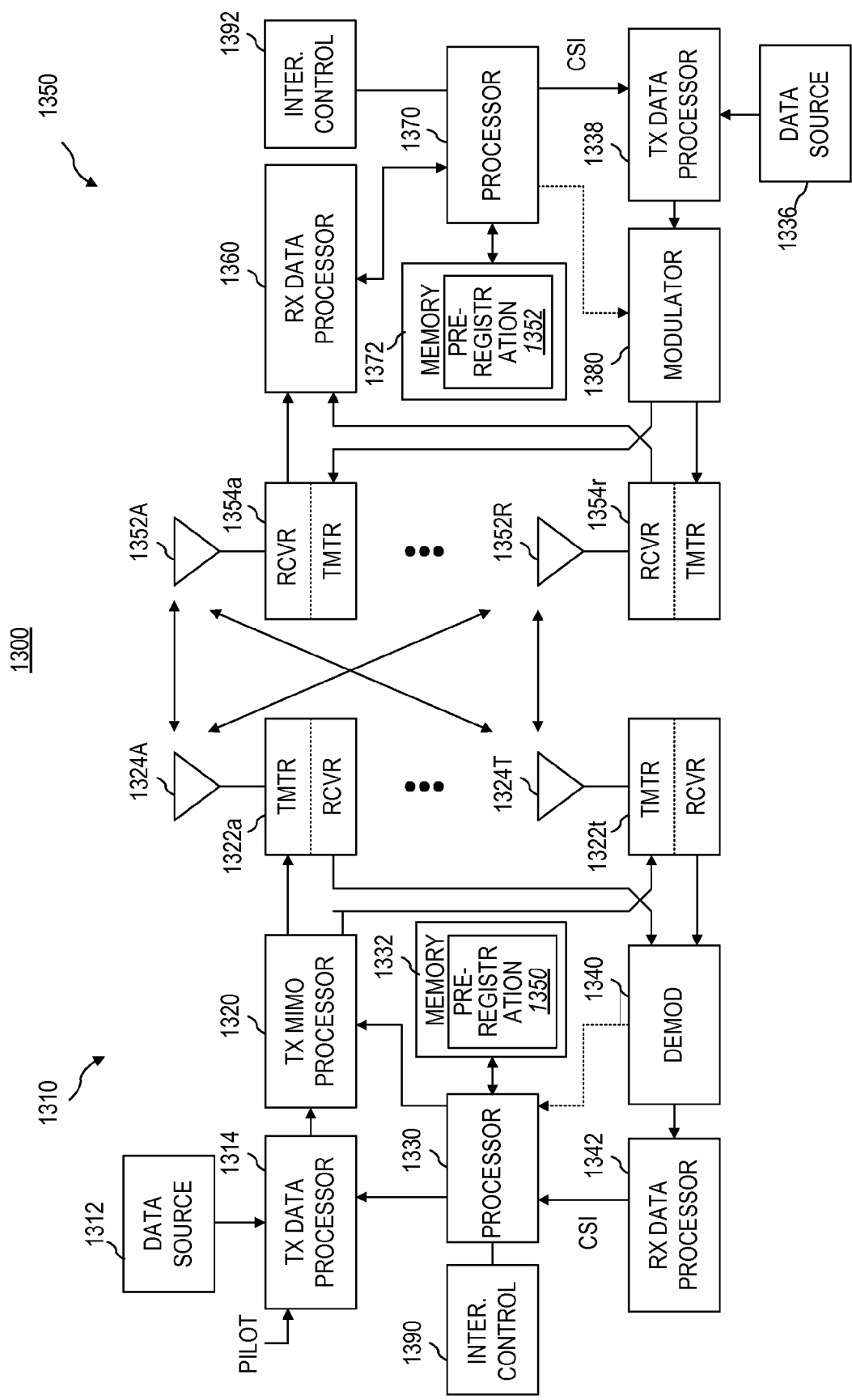
FIG. 13 illustrates a schematic diagram of two nodes for multiple input multiple output wireless communication.

The teachings herein may be incorporated into a node (e.g., a device) employing various components for communicating with at least one other node. FIG. 13 depicts several sample components that may be employed to facilitate communication between nodes. Specifically, FIG. 13 illustrates a wireless device 1310 (e.g., an access point) and a wireless device 1350 (e.g., an access terminal) of a MIMO system 1300. At the device 1310, traffic data for a number of data streams is provided from a data source 1312 to a transmit ("TX") data processor 1314.

In some aspects, each data stream is transmitted over a respective transmit antenna. The TX data processor 1314 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., Binary Phase Shift Keying (BPSK), Quadrature Phase-Shift Keying (QPSK), M-ary Phase Shift Keying (M-PSK), or Multiple Quadrature Amplitude Modulation (M-QAM)) selected for that data stream to provide modulation symbols. The data rate, coding, and modulation for each data stream may be determined by instructions performed by a processor 1330. A data memory 1332 may store program code, data, and other information used by the processor 1330 or other components of the device 1310.

The modulation symbols for all data streams are then provided to a TX MIMO processor 1320, which may further process the modulation symbols (e.g., for OFDM). The TX MIMO processor 1320 then provides $N_T$ modulation symbol streams to $N_T$ transceivers ("XCVR") 1322a-1322t that each has a transmitter (TMTR) and receiver (RCVR). In some aspects, the TX MIMO processor 1320 applies beam-forming weights to the symbols of the data streams and to the antenna from which the symbol is being transmitted.

Each transceiver 1322a-1322t receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 1322a-1322t are then transmitted from $N_T$ antennas 1324a-1324t, respectively.

At the device 1350, the transmitted modulated signals are received by $N_R$ antennas 1352a-1352r and the received signal from each antenna 1352a-1352r is provided to a respective transceiver ("XCVR") 1354a-1354r. Each transceiver 1354a-1354r conditions (e.g., filters, amplifies, and downconverts) a respective received signal, digitizes the conditioned signal to provide samples, and further processes the samples to provide a corresponding "received" symbol stream.

A receive ("RX") data processor 1360 then receives and processes the $N_R$ received symbol streams from $N_R$ transceivers 1354a-1354r based on a particular receiver processing technique to provide $N_T$ "detected" symbol streams. The RX data processor 1360 then demodulates, deinterleaves, and decodes each detected symbol stream to recover the traffic data for the data stream. The processing by the RX data processor 1360 is complementary to that performed by the TX MIMO processor 1320 and the TX data processor 1314 at the device 1310.

A processor 1370 periodically determines which pre-coding matrix to use. The processor 1370 formulates a reverse link message comprising a matrix index portion and a rank value portion. A data memory 1372 may store program code, data, and other information used by the processor 1370 or other components of the device 1350.

The reverse link message may comprise various types of information regarding the communication link and/or the received data stream. The reverse link message is then processed by a TX data processor 1338, which also receives traffic data for a number of data streams from a data source 1336, modulated by a modulator 1380, conditioned by the transceivers 1354a-1354r, and transmitted back to the device 1310.

At the device 1310, the modulated signals from the device 1350 are received by the antennas 1324a-1324t, conditioned by the transceivers 1322a-1322t, demodulated by a demodulator ("DEMOD") 1340, and processed by a RX data processor 1342 to extract the reverse link message transmitted by the device 1350. The processor 1330 then determines which pre-coding matrix to use for determining the beam-forming weights then processes the extracted message.

FIG. 13 also illustrates that the communication components may include one or more components that perform interference control operations. For example, an interference ("INTER.") control component 1390 may cooperate with the processor 1330 and/or other components of the device 1310 to send/receive signals to/from another device (e.g., device 1350). Similarly, an interference control component 1392 may cooperate with the processor 1370 and/or other components of the device 1350 to send/receive signals to/from another device (e.g., device 1310). It should be appreciated that for each device 1310 and 1350 the functionality of two or more of the described components may be provided by a single component. For example, a single processing component may provide the functionality of the interference control component 1390 and the processor 1330 and a single processing component may provide the functionality of the interference control component 1392 and the processor 1370.

The wireless device 1310 (e.g., an access point) and wireless device 1350 (e.g., an access terminal) can respectively incorporate a pre-registration component 1350, 1352 for performing the afore-mentioned selective pre-registration with an eHRPD network (not shown).

Figure 14:
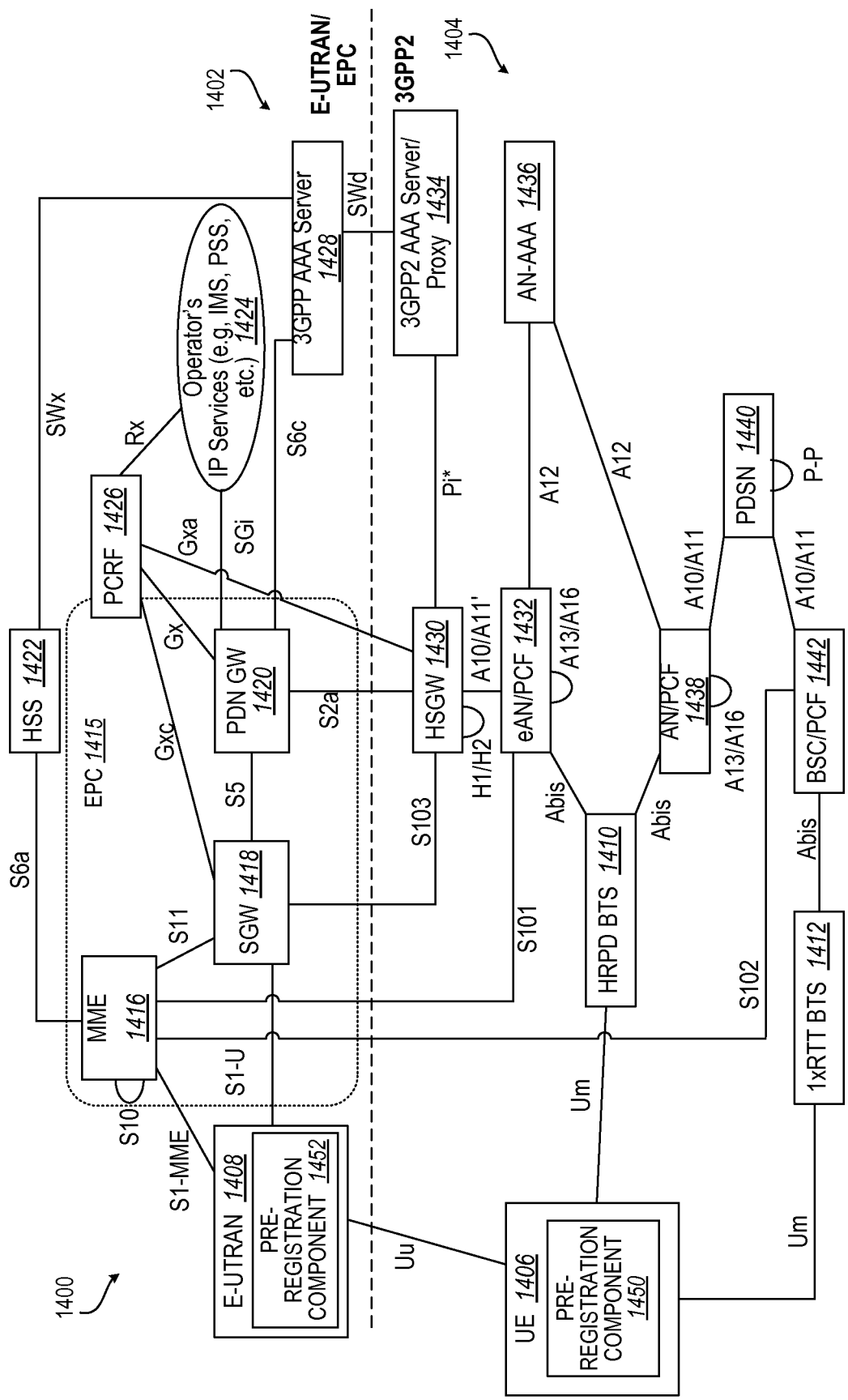
FIG. 14 illustrates a schematic diagram of a wireless communication system configured to support a number of users.

In FIG. 14, a communication system 1400 is depicted with an Evolved Universal Terrestrial Radio Access Network (E-UTRAN)/Evolved Packet Core (EPC) 1402 (i.e., GSM (Global System for Mobile Communications) or WCDMA (Wideband Code Division Multiple Access)) and a 3GPP2 network 1404 for providing coverage to a mobile device, depicted as UE 1406. The 3rd Generation Partnership Project 2 (3GPP2) is a collaboration between telecommunications associations to make a globally applicable third generation (3G) mobile phone system specification within the scope of the ITU's IMT-2000 project. In practice, 3GPP2 is the standardization group for CDMA2000, the set of 3G standards based on earlier 2G CDMA technology. 3GPP2 should not be confused with 3GPP, which specifies standards for another 3G technology known as Universal Mobile Telecommunications System (UMTS).

The LTE technology is a revolutionary upgrade of 3G systems including WCDMA and CDMA2000. The evolution path from 2G/3G systems to LTE is basically by realizing interworking and seamless handover between systems to migrate the existing network at a low cost. System Architecture Evolution (aka SAE) is the core network architecture of 3GPP's LTE wireless communication standard. SAE is the evolution of the General Packet Radio Service (GPRS) Core Network, with some differences: (1) simplified architecture; (2) All Internet Protocol Network (AIPN); and (3) support for higher throughput and lower latency radio access networks (RANs) support for, and mobility between, multiple heterogeneous RANs, including legacy systems as GPRS, but also non-3GPP systems (say WiMAX).

The evolved RAN for LTE consists of a single node, i.e., an evolved Base Node ("eNodeB" or "eNB") that interfaces with a UE 1406. The eNB is depicted as an E-UTRAN 1408 for the E-UTRAN/EPC 1402. The eNB hosts the PHYsical (PHY), Medium Access Control (MAC), Radio Link Control (RLC), and Packet Data Control Protocol (PDCP) layers that include the functionality of user-plane header-compression and encryption. It also offers Radio Resource Control (RRC) functionality corresponding to the control plane. It performs many functions including radio resource management, admission control, scheduling, enforcement of negotiated Uplink (UL) Quality of Service (QoS), cell information broadcast, ciphering/deciphering of user and control plane data, and compression/decompression of Downlink/Uplink (DL/UL) user plane packet headers.

Overall, three different Radio Access Technologies (RATs) are depicted for radio access to the UE 1406. The E-UTRAN 1408 has a Uu external radio interface (logical interface) to the UE 1406. On the 3GPP2 network 1404, both a HRPD Base Transceiver System (BTS) 1410 and a 1×RTT (Radio Transmission Technology) BTS 1412 can have a Um external radio interface to the UE 1406. Examples are Uu or Um to the UE 1406 for 3GPP systems and Um for 3GPP2 systems (i.e., CDMA). The external interface to the UE 1406 transports user data and signaling data over an air interface 1414.

The main component of the SAE architecture is the EPC 1415, also known as SAE Core. The EPC 1415 serves as equivalent of GPRS networks via subcomponents of a Mobility Management Entity (MME) 1416, Serving Gateway (SGW) 1418 and PDN Gateway (PGW) 1420.

The MME 1416 is the key control-node for the LTE access-network, depicted as the E-UTRAN 1408. It is responsible for idle mode UE tracking and paging procedure including retransmissions. It is involved in the bearer activation/deactivation process and is also responsible for choosing the SGW 1418 for a UE 1406 at the initial attach and at time of intra-LTE handover involving Core Network (CN) node relocation. It is responsible for authenticating the user (by interacting with the Home Subscriber Server (HSS)). The Non-Access Stratum (NAS) signaling terminates at the MME 1416 and it is also responsible for generation and allocation of temporary identities to UEs 1406. It checks the authorization of the UE 1406 to camp on the service provider's Public Land Mobile Network (PLMN) and enforces UE roaming restrictions. The MME 1416 is the termination point in the network for ciphering/integrity protection for NAS signaling and handles the security key management. Lawful interception of signaling is also supported by the MME 1416. The MME 1416 also provides the control plane function for mobility between LTE and 2G/3G access networks with the S3 interface terminating at the MME 1416 from the Serving GPRS Support Node (SGSN) (not depicted). The MME 1416 also terminates the S6a interface towards the Home Subscriber Server (HSS) 1422 for roaming UEs.

The SGW 1418 routes and forwards user data packets, while also acting as the mobility anchor for the user plane during inter-eNodeB handovers and as the anchor for mobility between LTE and other 3GPP technologies (terminating S4 interface and relaying the traffic between 2G/3G systems and PGW). For idle state UEs 1406, the SGW 1418 terminates the Downlink (DL) data path and triggers paging when DL data arrives for the UE 1406. It manages and stores UE contexts, e.g., parameters of the Internet Protocol (IP) bearer service, network internal routing information. It also performs replication of the user traffic in case of lawful interception.

The PGW 1420 provides connectivity from the UE 1406 to external packet data networks, depicted as Operator's IP Services 1424, such as IP Multimedia Subsystem (IMS), Packet Switched Services (PSS) etc., by being the point of exit and entry of traffic for the UE 1406. A UE 1406 may have simultaneous connectivity with more than one PGW 1420 for accessing multiple PDNs. The PGW 1420 performs policy enforcement, packet filtering for each user, charging support, lawful Interception and packet screening. Another key role of the PGW 1420 is to act as the anchor for mobility between 3GPP and non-3GPP technologies such as WiMAX and 3GPP2 (CDMA 1x and EvDO).

A key feature of the Evolved Packet System (EPS), otherwise referred herein as 3GPP Long Term Evolution (LTE), is the separation of the network entity that performs control-plane functionality (MME 1416) from the network entity that performs bearer-plane functionality (SGW 1418) with a well defined open interface between them (S11). Since E-UTRAN 1408 provides higher bandwidths to enable new services as well as to improve existing ones, separation of MME 1416 from SGW 1418 implies that SGW 1418 can be based on a platform optimized for high bandwidth packet processing, whereas the MME 1416 is based on a platform optimized for signaling transactions. This enables selection of more cost-effective platforms for, as well as independent scaling of, each of these two elements. Service providers can also choose optimized topological locations of SGWs 1418 within the network independent of the locations of MMEs 1416 in order to optimize bandwidth reduce latencies and avoid concentrated points of failure.

An Application Function (AF) is an element offering applications that require the Policy and Charging Control of traffic plane resources (e.g., UMTS Packet Switched (PS) domain/GPRS domain resources). The AF is depicted as an operator's IP services 1424. One example of an application function is Policy Control and Charging Rules Function (PCRF) 1426. The AF can use the Rx reference point to provide session information to the PCRF 1426. The PCRF 1426 is a functional element that encompasses policy control decision and flow based charging control functionalities. The PCRF 1426 provides network control regarding the service data flow detection, gating, QoS and flow based charging (except credit management) towards the Policy and Charging Enforcement Function (PCEF) (not shown). The PCRF receives session and media related information from the AF and informs AF of traffic plane events. The PCRF 1426 may check that the service information provided by the AF is consistent with the operator defined policy rules before storing the service information. The service information shall be used to derive the QoS for the service. The PCRF 1426 may reject the request received from the AF and as a result the PCRF 1426 indicates, in the response to the AF, the service information that can be accepted by the PCRF 1426. The PCRF 1426 may use the subscription information as basis for the policy and charging control decisions. The subscription information may apply for both session based and non-session based services. The subscription specific information for each service may contain e.g. max QoS class and max bit rate. If the AF requests it, the PCRF 1426 reports IP-CAN (Internet Protocol Connectivity Access Network) session events (including bearer events and events on AF signaling transport) to the AF via the Rx reference point.

A 3GPP Authentication, Authorization, Accounting (AAA) server 1428 is interfaced via an S6c to the PGW 1420 and an SWx interface to the HSS 1422.

S1-MME is the reference point for the control plane protocol between E-UTRAN 1408 and MME 1416. The protocol over this reference point is evolved Radio Access Network Application Protocol (eRANAP) and it uses Stream Control Transmission Protocol (SCTP) as the transport protocol.

S1-U reference point between E-UTRAN 1408 and SGW 1418 for the per-bearer user plane tunneling and inter-eNB path switching during handover. The transport protocol over this interface is GPRS Tunneling Protocol-User plane (GTP-U).

S2a provides the user plane with related control and mobility support between trusted non-3GPP IP access and the SGW 1418. S2a is based on Proxy Mobile Internet Protocol (PMIP). To enable access via trusted non-3GPP IP accesses that do not support PMIP, S2a also supports Client Mobile Internet Protocol version 4 (IPv4) Foreign Agent (FA) mode.

S2b provides the user plane with related control and mobility support between evolved Packet Data Gateway (ePDG) and the PDN GW. It is based on PMIP.

S2c provides the user plane with related control and mobility support between UE and the PDN GW. This reference point is implemented over trusted and/or untrusted non-3GPP Access and/or 3GPP access. This protocol is based on Client Mobile IP co-located mode.

S3 is the interface between SGSN (not shown) and MME 1416 and it enables user and bearer information exchange for inter 3GPP access network mobility in idle or active state. It is based on Gn reference point as defined between SGSNs.

S4 provides the user plane with related control and mobility support between SGSN and the SGW 1418 and is based on Gn reference point as defined between SGSN and Gateway GPRS Support Node (GGSN) (not shown).

S5 provides user plane tunneling and tunnel management between SGW 1418 and PGW 1420. It is used for SGW relocation due to UE mobility and if the SGW needs to connect to a non-collocated PDN GW for the required PDN connectivity.

S6a enables transfer of subscription and authentication data for authenticating/authorizing user access to the evolved system (AAA interface) between MME 1416 and HSS 1422.

S7 provides transfer of (QoS) policy and charging rules from Policy and Charging Rules Function (PCRF) 1426 to Policy and Charging Enforcement Function (PCEF) in the PGW 1420. This interface is based on the Gx interface.

S10 is the reference point between MMEs 1416 for MME relocation and MME to MME information transfer.

S11 is the reference point between MME 1416 and SGW 1418.

SGi is the reference point between the PGW 1420 and the packet data network 1428.

Packet data network (PDN) 1428 may be an operator-external public or private packet data network or an intra-operator packet data network, e.g. for provision of IMS services. This reference point corresponds to Gi for 2G/3G accesses Rx+. The Rx reference point resides between the Application Function and the PCRF 1426.

The 3GPP2 network 1404 is depicted as including a HSGW 1430, evolved HRPD Access Network/Packet Control Function (eAN/PCF) 1432, 3GPP2 AAA server/proxy 1434, Access Node (AN)-AAA 1436, AN/PCF 1438, Packet Data Serving Node (PDSN) 1440, and Base Station Controller (BSC)/PCF 1442 in addition to the HRPD BTS 1410 and 1×RTT BTS 1412.

In the architecture, several new interfaces including S101, S103 and S2a are introduced to realize the interworking between CDMA2000 HRPD and LTE. Corresponding to the system architecture of LTE, Packet Data Serving Node (PDSN) is split into the HSGW 1430 and PGW 1420 while Access Network/Packet Control Function (AN/PCF) 1438 is enhanced into eAN/PCF 1432 to support the three new interfaces. HRPD here is called evolved HRPD (eHRPD).

The E-UTRAN and the 3GPP2 eHRPD network architecture includes the following interfaces:

S101 reference point provides for the signaling interface between the MME 1416 in the 3GPP EPC 1415 and the eAN/PCF 1432 in the 3GPP2 (eHRPD) 1404. This S101 reference point provides tunneling of signaling and data between the UE 1406 and the target access network via the source/serving access network. This allows a UE 1406 to tunnel HRPD air interface signaling over the LTE system to make pre-registration and exchange handover signaling messages with the target system before the actual handover, thus realizing a seamless and rapid handover between two systems.

S103 reference point is the bearer interface between the EPC Serving Gateway (SGW) 1418 and the HSGW 1430, which is used to forward the downlink data, minimizing the packet loss during the transfer from LTE to HRPD. The S103 reference point connects the PGW 1420 in the 3GPP EPC 1415 to the HSGW 1430 in the 3GPP2 eHRPD network 1404.

For the interworking between E-UTRAN/EPC 1402 and 3GPP2 eHRPD network 1404, the following reference points are defined:

The H1 reference point carries signaling information between a source HSGW (S-HSGW) and a target HSGW (T-HSGW) for optimized inter-HSGW handoff.

The H2 reference point carries user traffic between a source HSGW (S-HSGW) and a target HSGW (T-HSGW) for optimized inter-HSGW handoff.

The Gxa reference point connects the PCRF 1426 in the 3GPP EPC 1415 to Bearer Binding and Event Reporting Function (BBERF) in the HSGW 1430 in the 3GPP2 eHRPD network 1404.

The Pi* reference point connects the HSGW 1430 to the 3GPP2 AAA server/proxy 1434.

The S2a reference point connects the PGW 1420 in the 3GPP EPC 1415 to the HSGW 1430 in the 3GPP2 eHRPD network 1404. This reference point provides the user plane with related control and mobility support between eHRPD network 1404 and the PGW 1420. S2a provides the user plane with related control and mobility support between trusted non-3GPP IP access (e.g., WiMAX access network) and the 3GPP core network (PGW 1420). It is defined between the Mobile Access Gateway and Packet Data Gateway. In the case that the Mobile IPv4 is used as S2a protocol, then the WiMAX side of this reference point is terminated by the MIPv4 Foreign Agent function.

S6b is the reference point between PGW 1420 and 3GPP AAA server/proxy 1434 for mobility related authentication if needed. S6b may also be used to retrieve and request storage of mobility parameters. This reference point may also be used to retrieve static QoS profile for a UE for non-3GPP access in case dynamic Policy and Charging Control (PCC) is not supported. Gx provides transfer of QoS policy and charging rules from PCRF 1426 to Policy and Charging Enforcement Function (PCEF) in the PGW 1420. Gxa provides transfer of QoS policy information from PCRF 1426 to the trusted non-3GPP accesses (e.g., Access Service Network (ASN) Gateway (GW)). Gxc provides transfer of QoS policy information from PCRF 1426 to the SGW 1418.

AN-AAA 1436 communicates with the Radio Network Controller (RNC) (not shown) in the Access Network (AN) to enable authentication and authorization functions to be performed at the AN 1432, 1438. The interface between AN 1432, 1438 and AN-AAA 1436 is known as the A12 interface.

HSGW 1430 provides interconnection between UE 1406 and the 3GPP EPS architecture, including seamless mobility, Policy and Charging Control (PCC) and roaming between LTE and HRPD. The HSGW 1430 is the entity that terminates the eHRPD access network interface from the eAN/PCF 1432 (i.e., A10/A11 interfaces). The HSGW 1430 routes UE originated or UE terminated packet data traffic. An HSGW 1430 also establishes, maintains and terminates link layer sessions to UEs 1406. The HSGW functionality provides interworking of the UE 1406 with the 3GPP EPS architecture and protocols. This includes support for mobility, policy control and charging (PCC), access authentication, and roaming. The HSGW 1430 supports inter-HSGW handoff as well, using S2a (Proxy Mobile Internet Protocol version 6 (PMIPv6)). The HSGW 1430 supports inter-HSGW handoff with context transfer. The HSGW 1430 may use inter-HSGW handoff without context transfer.

The eAN/PCF 1432 supports the tunneling of HRPD air interface signaling through S101. The enhanced AN/PCF solution adds a Signaling Adaptation Protocol (SAP) in the connection layer.

A10/A11 interface bear the transmission of signaling and data between PCF and PDSN 1440 for maintaining the Base Station System-Base Station Controller (BSS-BCF) A10 connection. The A10 interface bears data while A11 interface bears signaling.

Abis interface uses Abis protocol for interfaces between the BSC (not shown) and the BTS 1410, 1412. It consists of two parts on the application layer: control part (Abisc) and traffic part (Abist), the former converts the Um interface control channel signaling and the latter converts the control over the traffic channel.

The UE 1406 and EUTRAN 1408 can respectively incorporate a pre-registration component 1450, 1452 for performing the afore-mentioned selective pre-registration with the 3GPP2 eHRPD network 1404.

Those of skill would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Furthermore, various aspects are described herein in connection with a mobile device. A mobile device can also be called a system, a subscriber unit, a subscriber station, mobile station, mobile, mobile device, cellular device, multi-mode device, remote station, remote terminal, access terminal, user terminal, user agent, a user device, or user equipment, or the like. A subscriber station can be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem or similar mechanism facilitating wireless communication with a processing device.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Various aspects will be presented in terms of systems that may include a number of components, modules, and the like. It is to be understood and appreciated that the various systems may include additional components, modules, etc. and/or may not include all of the components, modules, etc. discussed in connection with the figures. A combination of these approaches may also be used. The various aspects disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.

In addition, the various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Furthermore, the one or more versions may be implemented as a method, apparatus, or article of manufacture using standard programming and/or engineering techniques to produce software, firmware, hardware, or any combination thereof to control a computer to implement the disclosed aspects. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope of the disclosed aspects.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed aspects is provided to enable any person skilled in the art to make or use the present disclosure. Various modifications to these aspects will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers. The term article of manufacture, as used herein, is intended to encompass a computer program accessible from any computer-readable device, carrier, or media.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein, will only be incorporated to the extent that no conflict arises between that incorporated material and the existing disclosure material.

What is claimed is:

1. A method for maintaining session continuity in a packet data network, comprising:
   communicating packet data with a first radio access network using a first radio access technology;
   determining a trigger exists for selectively pre-registering a packet data context; and
   pre-registering the packet data context with a second radio access network that uses a second radio access technology via a data tunnel established by the first radio access network, wherein pre-registering comprises partially pre-registering prior to the trigger and completing pre-registering after the trigger.

2. The method of claim 1, wherein communicating the packet data with the first radio access network using the first radio access technology further comprises utilizing 3GPP Long Term Evolution (LTE) protocols.

3. The method of claim 1, wherein pre-registering the packet data context with the second radio access network that uses the second radio access technology comprises utilizing evolved High Rate Packet Data (eHRPD) protocols.

4. The method of claim 3, wherein communicating the packet data with the first radio access network using the first radio access technology further comprises utilizing 3GPP Long Term Evolution (LTE) protocols.

5. The method of claim 1, wherein the packet data context comprises quality of service (QoS) context.

6. The method of claim 1, wherein the packet data context comprises point to point protocol (PPP) context.

7. The method of claim 1, wherein the packet data context comprises a Data Only (DO) session without a point to point protocol (PPP) state.

8. The method of claim 1, wherein determining the trigger exists for selectively pre-registering the packet data context further comprises determining an imminent handover from the first radio access network to the second radio access network.

9. The method of claim 8, wherein determining the imminent handover from the first radio access network to the second radio access network further comprises determining a degrading characteristic of an air channel between a user equipment and the first radio access network.

10. The method of claim 8, wherein determining the imminent handover from the first radio access network to the second radio access network further comprises determining an improving characteristic of an air channel between a user equipment and the second radio access network.

11. The method of claim 1, wherein determining the trigger exists for selectively pre-registering the packet data context further comprises determining whether a type of session is of a short duration nature.

12. The method of claim 1, wherein:
   partially pre-registering prior to the trigger comprises:
   creating a Data Optimized (DO) session using High Rate Packet Data (HRPD) in the second radio access technology with multiple personalities,
   performing Radio Access Network (RAN)-level authentication, and
   performing Link Control Protocol (LCP) negotiation, Extensible Authentication Protocol (EAP) Authentication, and Key Agreement (AKA) authentication; and
   completing pre-registering after the trigger comprises:
   establishing Packet Data Network (PDN) context at a HRPD Serving Gateway (HSGW) for each PDN connection that currently exists in the first radio access network using the first radio access technology comprising Long Term Evolution (LIE), and
   establishing Quality of Service (QoS) context at an evolved Access Node (eAN) and the HSGW for each QoS flow that currently exists in LTE.

13. The method of claim 1, wherein determining the trigger exists for selectively pre-registering the packet data context further comprises determining whether an application requests pre-registration.

14. The method of claim 1, wherein determining the trigger exists for selectively pre-registering the packet data context further comprises receiving a network request to pre-register.

15. The method of claim 14, wherein receiving the network request to pre-register further comprises receiving an overhead message signaled by the network containing parameters that define an extent of pre-registration call flow.

16. The method of claim 1, further comprising:
   communicating a plurality of packet data connections with the first radio access network using the first radio access technology;
   determining a trigger exists for selectively pre-registering a respective packet data context for a selected one of the plurality of packet data connections; and
   pre-registering the selected packet data context with the second radio access network that uses the second radio access technology via the data tunnel established by the first radio access network.

17. At least one processor for maintaining session continuity in a packet data network, comprising:
   a first module for communicating packet data with a first radio access network using a first radio access technology;
   a second module for determining a trigger exists for selectively pre-registering packet data context; and
   a third module for pre-registering the packet data context with a second radio access network that uses a second radio access technology via a data tunnel established by the first radio access network, wherein pre-registering comprises partially pre-registering prior to the trigger and completing pre-registering after the trigger.

18. A computer program product for maintaining session continuity in a packet data network, comprising:
   a non-transitory computer-readable storage medium comprising,
   a first set of codes for causing a computer to communicate packet data with a first radio access network using a first radio access technology;
   a second set of codes for causing the computer to determine a trigger exists for selectively pre-registering packet data context; and
   a third set of codes for causing the computer to pre-register the packet data context with a second radio access network that uses a second radio access technology via a data tunnel established by the first radio access network, wherein pre-registering comprises partially pre-registering prior to the trigger and completing pre-registering after the trigger.

19. An apparatus for maintaining session continuity in a packet data network, comprising:
   means for communicating packet data with a first radio access network using a first radio access technology;
   means for determining a trigger exists for selectively pre-registering packet data context; and means for pre-registering the packet data context with a second radio access network that uses a second radio access technology via a data tunnel established by the first radio access network, wherein the means for pre-registering comprises means for partially pre-registering prior to the trigger and means for completing pre-registering after the trigger.

20. The apparatus of claim 19, wherein the means for determining the trigger exists for selectively pre-registering the packet data context comprises means for determining an imminent handover from the first radio access network to the second radio access network.

21. The apparatus of claim 20, wherein the means for determining the imminent handover from the first radio access network to the second radio access network comprises means for determining a degrading characteristic of an air channel between a user equipment and the first radio access network.

22. The apparatus of claim 20, wherein the means for determining the imminent handover from the first radio access network to the second radio access network comprises means for determining an improving characteristic of an air channel between a user equipment and the second radio access network.

23. The apparatus of claim 19, wherein the means for determining the trigger exists for selectively pre-registering the packet data context comprises means for determining whether a type of session is of a short duration nature.

24. The apparatus of claim 19, wherein:
the means for partially pre-registering prior to the trigger comprises:
means for creating a Data Optimized (DO) session using High Rate Packet Data (HRPD) in the second radio access technology with multiple personalities,
means for performing Radio Access Network (RAN)-level authentication, and
means for performing Link Control Protocol (LCP) negotiation, Extensible Authentication Protocol (EAP) Authentication, and Key Agreement (AKA) authentication; and
the means for completing pre-registering after the trigger comprises:
means for establishing Packet Data Network (PDN) context at a HRPD Serving Gateway (HSGW) for each PDN connection that currently exists in the first radio access network using the first radio access technology comprising Long Term Evolution (LTE), and
means for establishing Quality of Service (QoS) context at an evolved Access Node (eAN) and the HSGW for each QoS flow that currently exists in LTE.

25. The apparatus of claim 19, wherein the means for determining the trigger exists for selectively pre-registering the packet data context comprises means for determining whether an application requests pre-registration.

26. An apparatus for maintaining session continuity in a packet data network, comprising:
a transceiver for communicating packet data with a first radio access network using a first radio access technology;
a computing platform for determining a trigger exists for selectively pre-registering packet data context; and
the transceiver further for pre-registering the packet data context with a second radio access network that uses a second radio access technology via a data tunnel established by the first radio access network, wherein pre-registering comprises partially pre-registering prior to the trigger and completing pre-registering after the trigger.

27. The apparatus of claim 26, wherein communicating the packet data with the first radio access network using the first radio access technology comprises utilizing 3GPP Long Term Evolution (LTE) protocols.

28. The apparatus of claim 26, wherein pre-registering the packet data context with the second radio access network that uses the second radio access technology comprises utilizing evolved High Rate Packet Data (eHRPD) protocols.

29. The apparatus of claim 28, wherein communicating the packet data with the first radio access network using the first radio access technology comprises utilizing 3GPP Long Term Evolution (LTE) protocols.

30. The apparatus of claim 26, wherein the packet data context comprises quality of service (QoS) context.

31. The apparatus of claim 26, wherein the packet data context comprises point to point protocol (PPP) context.

32. The apparatus of claim 26, wherein the packet data context comprises a Data Only (DO) session without a point to point protocol (PPP) state.

33. The apparatus of claim 26, wherein determining the trigger exists for selectively pre-registering the packet data context comprises determining an imminent handover from the first radio access network to the second radio access network.

34. The apparatus of claim 33, wherein determining the imminent handover from the first radio access network to the second radio access network comprises determining a degrading characteristic of an air channel between a user equipment and the first radio access network.

35. The apparatus of claim 33, wherein determining the imminent handover from the first radio access network to the second radio access network comprises determining an improving characteristic of an air channel between a user equipment and the second radio access network.

36. The apparatus of claim 26, wherein determining the trigger exists for selectively pre-registering the packet data context comprises determining whether a type of session is of a short duration nature.

37. The apparatus of claim 26, wherein
partially pre-registering prior to the trigger comprises:
creating a Data Optimized (DO) session using High Rate Packet Data (HRPD) in the second radio access technology with multiple personalities,
performing Radio Access Network (RAN)-level authentication, and
performing Link Control Protocol (LCP) negotiation, Extensible Authentication Protocol (EAP) Authentication, and Key Agreement (AKA) authentication; and
completing pre-registering after the trigger comprises:
establishing Packet Data Network (PDN) context at a HRPD Serving Gateway (HSGW) for each PDN connection that currently exists in the first radio access network using the first radio access technology comprising Long Term Evolution (LTE), and
establishing Quality of Service (QoS) context at an evolved Access Node (eAN) and the HSGW for each QoS flow that currently exists in LTE.

38. The apparatus of claim 26, wherein determining the trigger exists for selectively pre-registering the packet data context comprises determining whether an application requests pre-registration.

39. The apparatus of claim 26, wherein determining the trigger exists for selectively pre-registering the packet data context comprises receiving a network request to pre-register.

40. The apparatus of claim 39, wherein receiving the network request to pre-register comprises receiving an overhead message signaled by the network containing parameters that define an extent of pre-registration call flow.

41. The apparatus of claim 26, further comprising:
communicating a plurality of packet data connections with the first radio access network using the first radio access technology;
determining a trigger exists for selectively pre-registering a respective packet data context for a selected one of the plurality of packet data connections; and
pre-registering the selected packet data context with the second radio access network that uses the second radio access technology via the data tunnel established by the first radio access network.

42. A method for maintaining session continuity in a packet data network, comprising:
communicating packet data with user equipment from a first radio access network using a first radio access technology;
determining a trigger exists for selectively pre-registering a packet data context; and
pre-registering the packet data context by facilitating a data tunnel with a second radio access network that uses a second radio access technology, wherein pre-registering comprises partially pre-registering prior to the trigger completing pre-registering after the trigger.

43. The method of claim 42, wherein communicating the packet data with user equipment from the first radio access network using the first radio access technology further comprises utilizing 3GPP Long Term Evolution (LTE) protocols.

44. The method of claim 42, wherein pre-registering the packet data context by facilitating the data tunnel with the second radio access network that uses the second radio access technology comprises utilizing evolved High Rate Packet Data (eHRPD) protocols.

45. The method of claim 44, wherein communicating the packet data with user equipment from the first radio access network using the first radio access technology further comprises utilizing 3GPP Long Term Evolution (LTE) protocols.

46. The method of claim 42, wherein the packet data context comprises quality of service (QoS) context.

47. The method of claim 42, wherein the packet data context comprises point to point protocol (PPP) context.

48. The method of claim 42, wherein the packet data context comprises a Data Only (DO) session without a point to point protocol (PPP) state.

49. The method of claim 42, wherein determining the trigger exists for selectively pre-registering the packet data context further comprises determining an imminent handover from the first radio access network to the second radio access network.

50. The method of claim 49, wherein determining the imminent handover from the first radio access network to the second radio access network further comprises determining a degrading characteristic of an air channel between the user equipment and the first radio access network.

51. The method of claim 49, wherein determining the imminent handover from the first radio access network to the second radio access network further comprises determining an improving characteristic of an air channel between the user equipment and the second radio access network.

52. The method of claim 42, wherein determining the trigger exists for selectively pre-registering the packet data context further comprises determining whether a type of session is of a short duration nature.

53. The method of claim 42, wherein:
partially pre-registering prior to the trigger comprises:
creating a Data Optimized (DO) session using High Rate Packet Data (HRPD) in the second radio access technology with multiple personalities,
performing Radio Access Network (RAN)-level authentication, and
performing Link Control Protocol (LCP) negotiation, Extensible Authentication Protocol (EAP) Authentication, and Key Agreement (AKA) authentication; and
completing pre-registering after the trigger comprises:
establishing Packet Data Network (PDN) context at a HRPD Serving Gateway (HSGW) for each PDN connection that currently exists in the first radio access network using the first radio access technology comprising Long Term Evolution (LTE), and
establishing Quality of Service (QoS) context at an evolved Access Node (eAN) and the HSGW for each QoS flow that currently exists in LTE.

54. The method of claim 42, wherein determining the trigger exists for selectively pre-registering the packet data context further comprises determining whether an application requests pre-registration.

55. The method of claim 42, wherein determining the trigger exists for selectively pre-registering the packet data context further comprises transmitting a network request to the user equipment to pre-register.

56. The method of claim 55, wherein transmitting the network request to the user equipment to pre-register further comprises transmitting an overhead message to signal parameters that define an extent of pre-registration call flow.

57. The method of claim 42, further comprising:
communicating a plurality of packet data connections with user equipment from the first radio access network using the first radio access technology;
determining a trigger exists for selectively pre-registering a respective packet data context for a selected one of the plurality of packet data connections; and
pre-registering the selected packet data context by facilitating a data tunnel with the second radio access network that uses the second radio access technology.

58. At least one processor for maintaining session continuity in a packet data network, comprising:
a first module for communicating packet data with user equipment from a first radio access network using a first radio access technology;
a second module for determining a trigger exists for selectively pre-registering a packet data context; and
a third module for pre-registering the packet data context by facilitating a data tunnel with a second radio access network that uses a second radio access technology, wherein pre-registering comprises partially pre-registering prior to the trigger and completing pre-registering after the trigger.

59. A computer program product for maintaining session continuity in a packet data network, comprising:
a non-transitory computer-readable storage medium comprising,
a first set of codes for causing a computer to communicate packet data with user equipment from a first radio access network using a first radio access technology;
a second set of codes for causing the computer to determine a trigger exists for selectively pre-registering a packet data context; and
a third set of codes for causing the computer to pre-register the packet data context by facilitating a data tunnel with a second radio access network that uses a second radio access technology, wherein rep-registering comprises partially pre-registering prior to the trigger and completing pre-registering after the trigger.

60. An apparatus for maintaining session continuity in a packet data network, comprising:
means for communicating packet data with user equipment from a first radio access network using a first radio access technology;
means for determining a trigger exists for selectively pre-registering a packet data context; and
means for pre-registering the packet data context by facilitating a data tunnel with a second radio access network that uses a second radio access technology, wherein the means for pre-registering comprises means for partially pre-registering prior to the trigger and means for completing pre-registering after the trigger.

61. The apparatus of claim 60, wherein the means for determining the trigger exists for selectively pre-registering the packet data context comprises means for determining an imminent handover from the first radio access network to the second radio access network.

62. The apparatus of claim 61, wherein the means for determining the imminent handover from the first radio access network to the second radio access network comprises means for determining a degrading characteristic of an air channel between the user equipment and the first radio access network.

63. The apparatus of claim 61, wherein the means for determining the imminent handover from the first radio access network to the second radio access network comprises means for determining an improving characteristic of an air channel between the user equipment and the second radio access network.

64. The apparatus of claim 60, wherein the means for determining the trigger exists for selectively pre-registering the packet data context comprises means for determining whether a type of session is of a short duration nature.

65. The apparatus of claim 60, wherein:
the means for partially pre-registering prior to the trigger comprises:
means for creating a Data Optimized (DO) session using High Rate Packet Data (HRPD) in the second radio access technology with multiple personalities,
means for performing Radio Access Network (RAN)-level authentication, and
means for performing Link Control Protocol (LCP) negotiation, Extensible Authentication Protocol (EAP) Authentication, and Key Agreement (AKA) authentication; and
the means for completing pre-registering after the trigger comprises:
means for establishing Packet Data Network (PDN) context at a HRPD Serving Gateway (HSGW) for each PDN connection that currently exists in the first radio access network using the first radio access technology comprising Long Term Evolution (LTE), and
means for establishing Quality of Service (QoS) context at an evolved Access Node (eAN) and the HSGW for each QoS flow that currently exists in LTE.

66. The apparatus of claim 60, wherein the means for determining the trigger exists for selectively pre-registering the packet data context comprises means for determining whether an application requests pre-registration.

67. An apparatus for maintaining session continuity in a packet data network, comprising:
a transceiver for communicating packet data with user equipment from a first radio access network using a first radio access technology;
a computing platform for determining a trigger exists for selectively pre-registering a packet data context; and
a network interface for pre-registering the packet data context by facilitating a data tunnel with a second radio access network that uses a second radio access technology, wherein pre-registering comprises partially pre-registering prior to the trigger and completing pre-registering after the trigger.

68. The apparatus of claim 67, wherein communicating the packet data with user equipment from the first radio access network using the first radio access technology comprises utilizing 3GPP Long Term Evolution (LTE) protocols.

69. The apparatus of claim 67, wherein pre-registering the packet data context by facilitating the data tunnel with the second radio access network that uses the second radio access technology comprises utilizing evolved High Rate Packet Data (eHRPD) protocols.

70. The apparatus of claim 69, wherein communicating the packet data with user equipment from the first radio access network using the first radio access technology comprises utilizing 3GPP Long Term Evolution (LTE) protocols.

71. The apparatus of claim 67, wherein the packet data context comprises quality of service (QoS) context.

72. The apparatus of claim 67, wherein the packet data context comprises point to point protocol (PPP) context.

73. The apparatus of claim 67, wherein the packet data context comprises a Data Only (DO) session without a point to point protocol (PPP) state.

74. The apparatus of claim 67, wherein determining the trigger exists for selectively pre-registering the packet data context comprises determining an imminent handover from the first radio access network to the second radio access network.

75. The apparatus of claim 74, wherein determining the imminent handover from the first radio access network to the second radio access network comprises determining a degrading characteristic of an air channel between the user equipment and the first radio access network.

76. The apparatus of claim 74, wherein the computing platform is further for determining the imminent handover from the first radio access network to the second radio access network comprises determining an improving characteristic of an air channel between the user equipment and the second radio access network.

77. The apparatus of claim 67, wherein the computing platform is further for determining the trigger exists for selectively pre-registering the packet data context comprises determining whether a type of session is of a short duration nature.

78. The apparatus of claim 67, wherein:
partially pre-registering prior to the trigger comprises:
creating a Data Optimized (DO) session using High Rate Packet Data (HRPD) in the second radio access technology with multiple personalities,
performing Radio Access Network (RAN)-level authentication, and
performing Link Control Protocol (LCP) negotiation, Extensible Authentication Protocol (EAP) Authentication, and Key Agreement (AKA) authentication; and
completing pre-registering after the trigger comprises:
establishing Packet Data Network (PDN) context at a HRPD Serving Gateway (HSGW) for each PDN connection that currently exists in the first radio access network using the first radio access technology comprising Long Term Evolution (LTE), and establishing Quality of Service (QoS) context at an evolved Access Node (eAN) and the HSGW for each QoS flow that currently exists in LTE.

79. The apparatus of claim 67, wherein determining the trigger exists for selectively pre-registering the packet data context comprises determining whether an application requests pre-registration.

80. The apparatus of claim 67, wherein determining the trigger exists for selectively pre-registering the packet data context comprises transmitting a network request to the user equipment to pre-register.

81. The apparatus of claim 80, wherein transmitting the network request to the user equipment to pre-register comprises transmitting an overhead message to signal parameters that define an extent of pre-registration call flow.

82. The apparatus of claim 67, wherein:
the transceiver is further for communicating a plurality of packet data connections with user equipment from the first radio access network using the first radio access technology;
the computing platform is further for determining a trigger exists for selectively pre-registering a respective packet data context for a selected one of the plurality of packet data connections; and
the network interface is further for pre-registering the selected packet data context by facilitating a data tunnel with the second radio access network that uses the second radio access technology.

* * * * *